United States Patent
Kim et al.

(10) Patent No.: US 11,961,522 B2
(45) Date of Patent: Apr. 16, 2024

(54) VOICE RECOGNITION DEVICE AND METHOD

(71) Applicant: Samsung Electronics Co., Ltd., Suwon-si (KR)

(72) Inventors: Chanwoo Kim, Suwon-si (KR); Dhananjaya N. Gowda, Suwon-si (KR); Sungsoo Kim, Suwon-si (KR); Minkyu Shin, Suwon-si (KR); Larry Paul Heck, Mountain View, CA (US); Abhinav Garg, Suwon-si (KR); Kwangyoun Kim, Suwon-si (KR); Mehul Kumar, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 17/296,806

(22) PCT Filed: Nov. 22, 2019

(86) PCT No.: PCT/KR2019/016181
§ 371 (c)(1),
(2) Date: May 25, 2021

(87) PCT Pub. No.: WO2020/111676
PCT Pub. Date: Jun. 4, 2020

(65) Prior Publication Data
US 2022/0005481 A1 Jan. 6, 2022

Related U.S. Application Data

(60) Provisional application No. 62/848,698, filed on May 16, 2019, provisional application No. 62/772,382, filed on Nov. 28, 2018.

(30) Foreign Application Priority Data

Mar. 28, 2019 (KR) .......................... 10-2019-0036376
Nov. 21, 2019 (KR) .......................... 10-2019-0150494

(51) Int. Cl.
*G10L 17/02* (2013.01)
*G10L 17/04* (2013.01)
(Continued)

(52) U.S. Cl.
CPC .............. *G10L 17/02* (2013.01); *G10L 17/04* (2013.01); *G10L 25/21* (2013.01); *G10L 17/18* (2013.01); *G10L 17/20* (2013.01)

(58) Field of Classification Search
CPC ......... G10L 17/02; G10L 17/04; G10L 25/21; G10L 17/18; G10L 17/20
(Continued)

(56) References Cited

U.S. PATENT DOCUMENTS 8,103,020 B2 * 1/2012 Avendano .............. H03G 7/007
381/103
9,031,268 B2 * 5/2015 Fejzo ...................... H04S 7/303
381/310
(Continued)

FOREIGN PATENT DOCUMENTS

CN 105261357 A 1/2016
CN 106683687 A 5/2017
(Continued)

OTHER PUBLICATIONS

Umesh, S., & Sinha, R. (2007). A study of filter bank smoothing in MFCC features for recognition of children's speech. IEEE Transactions on audio, speech, and language processing, 15(8), 2418-2430.*

(Continued)

*Primary Examiner* — Edwin S Leland, III
(74) *Attorney, Agent, or Firm* — Jefferson IP Law, LLP

(57) ABSTRACT

The disclosure relates to an electronic apparatus for recognizing user voice and a method of recognizing, by the electronic apparatus, the user voice. According to an
(Continued)

embodiment, the method of recognizing the user voice includes obtaining an audio signal segmented into a plurality of frame units, determining an energy component for each filter bank by applying a filter bank distributed according to a preset scale to a frequency spectrum of the audio signal segmented into the frame units, smoothing the determined energy component for each filter bank, extracting a feature vector of the audio signal based on the smoothed energy component for each filter bank, and recognizing the user voice in the audio signal by inputting the extracted feature vector to a voice recognition model.

15 Claims, 23 Drawing Sheets

(51) Int. Cl.
  *G10L 25/21* (2013.01)
  *G10L 17/18* (2013.01)
  *G10L 17/20* (2013.01)
(58) Field of Classification Search
  USPC .......................................................... 704/246
  See application file for complete search history.

(56) References Cited

U.S. PATENT DOCUMENTS

| | | | |
|---|---|---|---|
| 9,954,506 B2* | 4/2018 | Seefeldt | H03G 9/24 |
| 10,573,294 B2 | 2/2020 | Chen et al. | |
| 10,783,178 B2* | 9/2020 | Garrett | H04W 4/02 |
| 2002/0062211 A1 | 5/2002 | Li et al. | |
| 2004/0148165 A1* | 7/2004 | Beyerlein | G10L 15/07 |
| | | | 704/231 |
| 2005/0126369 A1* | 6/2005 | Kirkeby | H04H 60/27 |
| | | | 84/1 |
| 2005/0182628 A1* | 8/2005 | Choi | G10L 15/08 |
| | | | 704/252 |
| 2006/0190257 A1* | 8/2006 | Forbes | G10L 15/02 |
| | | | 704/255 |
| 2008/0162134 A1* | 7/2008 | Forbes | G10L 15/02 |
| | | | 704/E15.011 |
| 2010/0280827 A1 | 11/2010 | Mukerjee et al. | |
| 2011/0035219 A1* | 2/2011 | Kadirkamanathan | |
| | | | G10L 15/187 |
| | | | 707/769 |
| 2011/0066426 A1* | 3/2011 | Lee | G10L 15/07 |
| | | | 704/E15.001 |
| 2011/0313764 A1* | 12/2011 | Bacchiani | G10L 15/32 |
| | | | 704/235 |
| 2012/0245927 A1 | 9/2012 | Bondy | |
| 2013/0110521 A1 | 5/2013 | Hwang et al. | |
| 2014/0200881 A1 | 7/2014 | Chatlani | |
| 2014/0379334 A1* | 12/2014 | Fry | G10L 15/22 |
| | | | 704/235 |
| 2015/0032449 A1* | 1/2015 | Sainath | G10L 15/16 |
| | | | 704/235 |
| 2016/0019887 A1* | 1/2016 | Kim | G10L 15/183 |
| | | | 704/246 |
| 2017/0018270 A1* | 1/2017 | Min | G10L 15/065 |
| 2018/0061402 A1* | 3/2018 | Devaraj | G10L 15/22 |
| 2018/0075860 A1 | 3/2018 | Parada et al. | |
| 2018/0197533 A1* | 7/2018 | Lyon | G10L 15/02 |
| 2018/0211652 A1* | 7/2018 | Mun | G10L 15/187 |
| 2019/0122654 A1* | 4/2019 | Song | G10L 15/16 |
| 2022/0005481 A1* | 1/2022 | Kim | G10L 17/02 |

FOREIGN PATENT DOCUMENTS

| | | |
|---|---|---|
| CN | 107346659 A | 11/2017 |
| CN | 108877827 A | 11/2018 |
| EP | 3 624 114 A1 | 3/2020 |
| KR | 10-2008-0077874 A | 8/2008 |
| KR | 10-1295727 B1 | 8/2013 |
| KR | 10-2016-0010961 A | 1/2016 |
| KR | 10-2018-0090046 A | 8/2018 |
| KR | 10-2019-0045038 A | 5/2019 |
| KR | 10-2167157 B1 | 10/2020 |
| WO | 2017/217978 A1 | 12/2017 |
| WO | 2021/040842 A1 | 3/2021 |

OTHER PUBLICATIONS

Ian Williams et al., "Contextual Speech Recognition in End-to-End Neural Network Systems using Beam Search", Interspeech 2018, Sep. 2, 2018, pp. 2227-2231, XP055719650.
Dhananjaya Gowda et al., "Multi-task multi-resolution char-to-BPE cross-attention decoder for end-to-end speech recognition", Interspeech 2019, Sep. 15, 2019, pp. 2783-2787, XP055846610.
Abhinav Garg et al., "Improved Multi-Stage Training of Online Attention-Based Encoder-Decoder Models", 2019 IEEE Automatic Speech Recognition and Understanding Workshop (ASRU), IEEE, Dec. 14, 2019, pp. 70-77, XP033718917.
Ahmed Mostafa Gouda et al., "Robust Automatic Speech Recognition System Based on Using Adaptive Time-Frequency Masking", 2016 11th International Conference on Computer Engineering & Systems (ICCES), IEEE, Dec. 20, 2016, pp. 181-186, XP033046674.
Rohit Sinha et al., "A shift-based approach to speaker normalization using non-linear frequency-scaling model", Speech Communication, Elsevier Science Publishers, Amsterdam, NL, vol. 50, No. 3, Jan. 29, 2008, pp. 191-202, XP022436795.
S. Umesh et al., "A Study of Filter Bank Smoothing in MFCC Features for Recognition of Children's Speech", IEEE Transactions on Audio, Speech and Language Processing, IEEE, US, vol. 15, No. 8, Oct. 15, 2007, pp. 2418-2430, XP011192988.
Shih-Hsiang Lin et al., "Improved Histogram Equalzaiton (HEQ) for Robust Speech Recogntion", Multimedia and Expo, 2007 IEEE International Conference on, IEEE, PI, Jul. 2, 2007, pp. 2234-2237, XP031124105.
Chanwoo Kim et al., "Improved vocal tract length perturbation for a state-of-the art end-to-end speech recognition system", Interspeech 2019, Sep. 19, 2019, pp. 739-741.
Ziwon Hyung et al., "Customized Wake on Voice—Prelude of Speech-enabled AI Assistants", Samsung Best Paper Award 2018.
Chanwoo Kim et al., "Generation of large-scale simulated utterances in virtual rooms to train deep-neural networks for far-field speech recognition in Google Home" Google Speech, 2017.
Chanwoo Kim et al., "Efficient Implementation of the Room Simulator for Training Deep Neural Network Acoustic Models", Google Speech, 2018.
Michael L. Seltzer et al., "An investigation of deep neural networks for noise robust speech recognition" IEEE, ICASSP 2013.
Geoffrey Hinton et al., "Deep neural networks for acoustic modeling in speech recognition—The shared views of four research groups", IEEE Signal Processing Magazine, Nov. 2012.
Dong Yu et al., "Feature Learning in Deep Neural Networks—Studies on Speech Recognition Tasks", Mar. 8, 2013.
Vincent Vanhoucke et al., "Improving the speed of neural networks on CPUs", 2011.
Tara N. Sainath et al., "Multichannel Signal Processing with Deep Neural Networks for Automatic Speech Recognition", 2017.
Tara N. Sainath et al., "Raw Multichannel Processing Using Deep Neural Networks", 2017.
Bo Li et al., "Acoustic modeling for Google Home", Google, Inc. U.S.A, 2017.
Hagen Soltau et al., "Neural Speech Recognizer: Acoustic-to-Word LSTM Model for Large Vocabulary Speech Recognition", ISCA Archive, Interspeech 2017.
Navdeep Jaitly et al., "Vocal Tract Length Perturbation (VTLP) improves speech recognition", 2013.
Chanwoo Kim et al., End-to-end Training of a Large Vocabulary End-to-end Speech Recognition System, Samsung Best Paper Award 2019.

(56) References Cited

OTHER PUBLICATIONS

Kanishka Rao et al., "Exploring Architectures, Data and Units for Streaming End-to-End Speech Recognition with RNN-transducer", ASRU 2017, Jan. 2, 2018, https://arxiv.org/pdf/1801.00841.pdf.
Kazuki Irie et al., "On the Choice of Modeling Unit for Sequence-to-Sequence Speech Recognition", Jul. 23, 2019, https://arxiv.org/pdf/1902.01955.pdf.
Chanwoo Kim et al., Maximum Uniformity of Feature Distribution for Improved Deep Neural Network Training in Automatic Speech Recognition, Samsung Research, 2019.
Chanwoo Kim et al., "Power-Normalized Cepstral Coefficients (PNCC) for Robust Speech Recognition", 2015, IEEE/ACM Transactions on Audio, Speech, and Language Processing, vol. 24, No. 7, Jul. 2016.
Chengzhu Yu et al., "A Multistage Training Framework for Acoustic-to-Word Model", Proc. Interspeech 2018, pp. 786-790, https://www.isca-speech.org/archive/Interspeech_2018/pdfs/1452.pdf.
Ramon Sanabria et al., "Hierarchical MultiTask Learning with CTC", SLT 2018, Jan. 14, 2019, https://arxiv.org/abs/1807.07104.
Zichao Yang et al., "Hierarchical Attention Networks for Document Classification", NAACL HLT 2016, https://www.cs.cmu.edu/~./hovy/papers/16HLT-hierarchical-attention-networks.pdf.
A. Zehetner, M. Hagmuller et al., "Wake-Up-Word Spotting For Mobile Systems", EUSIPCO 2014.
Extended European Search Report dated Oct. 14, 2021, issued in European Patent Application No. 20744656.8-1210.
Extended European Search Report dated Oct. 28, 2021, issued in European Patent Application No. 19888960.2-1210.
International Search Report dated May 6, 2020, issued in International Patent Application No. PCT/KR2020/001061.
International Search Report dated Mar. 4, 2020, issued in International Patent Application No. PCT/KR2019/016181.
International Search Report dated Aug. 13, 2020, issued in International Patent Application No. PCT/KR2020/006300.
Luise Valentin Rygaard, "Using Synthesized Speech to Improve Speech Recognition for Low-Resource Languages", Dec. 31, 2015, pp. 1-6, XP055512265.
Sei Ueno et al., "Multi-speaker Sequence-to-sequence Speech Synthesis for Data Augmentation in Acoustic-to-wo rd Speech Recognition", 2019 IEEE International Conference on Acoustics, Speech and Signal Processing (ICASSP), May 12, 2019, pp. 6161-6165, XP033565395.
Eva Sharma et al., "Adaption of RNN Transducer with Text-To-Speech Technology for Keyword Spotting", 2020 IEEE International Conference on Acoustics, Speech and Signal Processing (ICASSP), May 4, 2020, pp. 7484-7488, XP033792821.
Extended European Search Report dated Dec. 7, 2021, issued in European Patent Application No. 20806657.1-1210.
European Office Action dated Aug. 21, 2023, issued in European Patent Application No. 20744656.8.
European Office Action dated Oct. 26, 2023, issued in European Patent Application No. 19888960.2.
Chinese Office Action dated Jan. 27, 2024, issued in Chinese Patent Application No. 201980077694.X.

* cited by examiner

FIG. 7
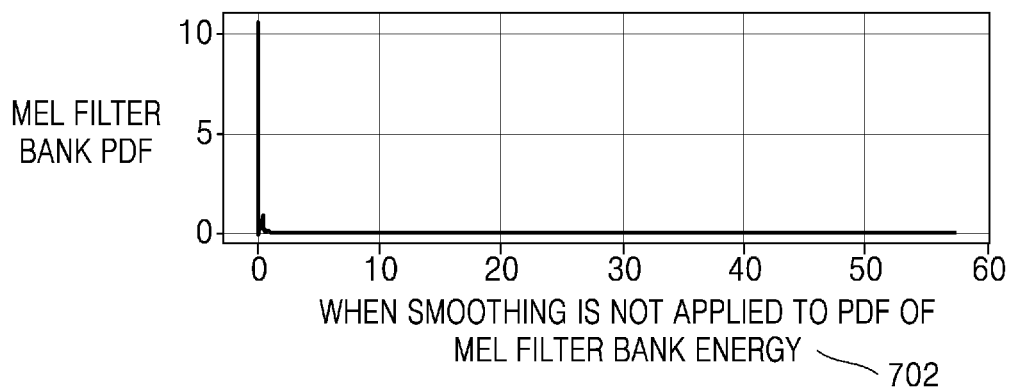
WHEN SMOOTHING IS NOT APPLIED TO PDF OF
MEL FILTER BANK ENERGY ~702
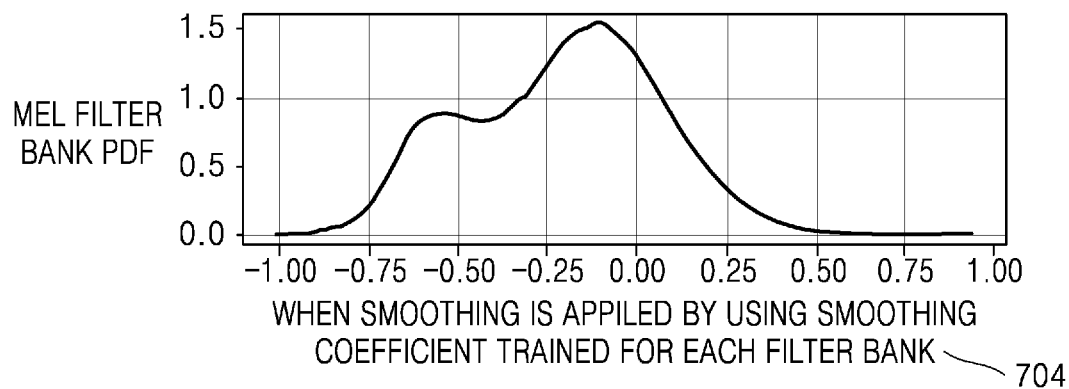
WHEN SMOOTHING IS APPILED BY USING SMOOTHING
COEFFICIENT TRAINED FOR EACH FILTER BANK ~704
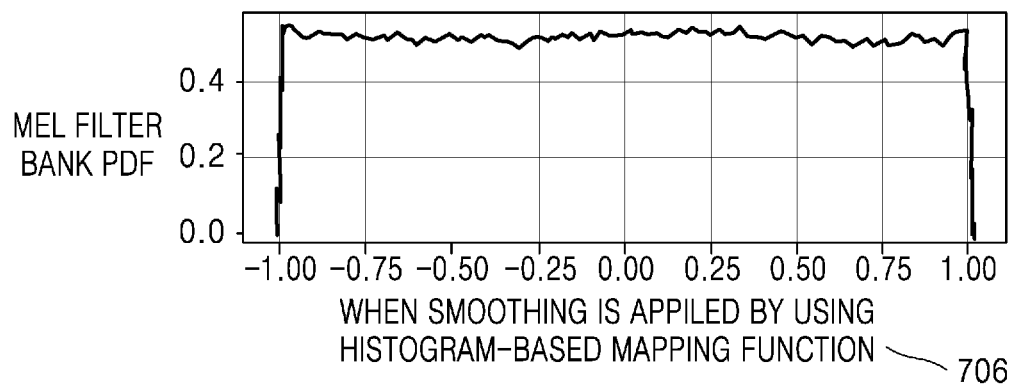
WHEN SMOOTHING IS APPILED BY USING
HISTOGRAM-BASED MAPPING FUNCTION ~706

VOICE RECOGNITION DEVICE AND METHOD

TECHNICAL FIELD

The present disclosure relates to a voice recognition device and method. More particularly, the present disclosure relates to a method of processing audio data for voice recognition.

BACKGROUND ART

An artificial intelligence (AI) system, unlike a conventional rule-based smart system, is a smart system that learns and determines by itself. The more an AI system is used, the higher a recognition rate, and thus, user preferences can be more accurately understood. Accordingly, the conventional rule-based smart system is gradually being replaced by a deep learning-based AI system.

AI technology consists of machine learning (deep learning) and element technologies using machine learning. Machine learning is an algorithm technology that classifies/learns the features of input data, and the element technology is a technology that utilizes a machine learning algorithm such as deep learning and the like, and consists of technical fields including linguistic understanding, visual understanding, inference/prediction, knowledge expression, motion control, and the like.

Artificial intelligence technology is applied to various fields as follows. Linguistic understanding is a technology that recognizes and applies/processes human language/text, and includes natural language processing, machine translation, dialogue system, question-and-answer, voice recognition/synthesis, and the like. Visual understanding is a technology that recognizes and processes objects like human vision, and includes object recognition, object tracking, image search, human recognition, scene understanding, space understanding, image improvement, and the like. Inference and prediction are a technology that logically infers and predicts information by determining the information, and includes knowledge/probability-based inference, optimization prediction, preference-based planning, recommendation, and the like. Knowledge expression is a technology that processes human experience information into knowledge data through automation, and includes knowledge construction (data generation/classification), knowledge management (data utilization), and the like. Motion control is a technology that controls the autonomous driving of a vehicle and the movement of a robot, and includes movement control (navigation, collision, driving), operation control (behavior control), and the like.

Recently, in the field of voice recognition, various technologies for recognizing user voice are being studied, and a voice recognition method based on an artificial neural network using an end-to-end learning method is being actively studied. In particular, in the field of voice recognition, technology development is necessary to improve the accuracy of voice recognition.

DESCRIPTION OF EMBODIMENTS

Technical Problem

According to an embodiment, provided is a voice recognition device and method for recognizing a user's voice using a voice recognition model.

Furthermore, according to an embodiment, provided is a device and method for learning a voice recognition model based on an audio signal. In detail, provided is an audio data processing method for improving the accuracy of voice recognition.

Solution to Problem

According to an embodiment, a method of recognizing user voice includes obtaining an audio signal segmented into a plurality of frame units, determining an energy component for each filter bank by applying a filter bank distributed according to a preset scale to a frequency spectrum of the audio signal segmented into the frame units, smoothing the determined energy component for each filter bank, extracting a feature vector of the audio signal based on the smoothed energy component for each filter bank, and recognizing the user voice in the audio signal by inputting the extracted feature vector to a voice recognition model.

Furthermore, according to an embodiment, an electronic apparatus for recognizing user voice includes a memory storing one or more instructions and a processor configured to execute the one or more instructions, in which the processor is further configured to, by executing the one or more instructions, obtain an audio signal segmented into a plurality of frame units, determine an energy component for each filter bank by applying a filter bank distributed according to a preset scale to a frequency spectrum of the audio signal segmented into the frame units, smooth the determined energy component for each filter bank, extract a feature vector of the audio signal based on the smoothed energy component for each filter bank, and recognize the user voice in the audio signal by inputting the extracted feature vector to a voice recognition model.

Furthermore, according to an embodiment, a method of processing an audio signal, by which an electronic apparatus trains a voice recognition model, includes obtaining a first audio signal segmented into a plurality of frame units to train the voice recognition model, obtaining a frequency spectrum of the first audio signal segmented into the frame units, transforming frequency axis of the frequency spectrum of the first audio signal to represent a variation of different vocal tract lengths of a plurality of speakers, generating a second audio signal by using the frequency spectrum of the first audio signal in which the frequency axis is transformed, and extracting a feature vector of the generated second audio signal.

The method may further include applying a room impulse filter indicating the acoustic feature of the second audio signal for each transfer path in a room to the second audio signal and extracting a feature vector from the second audio signal to which the room impulse filter is applied.

The transforming of the frequency axis may include determining a warping coefficient that is randomly generated for each frame, determining a warping function to transform frequency axis of the frequency spectrum of the first audio signal based on the determined warping coefficient, and transforming frequency axis of the frequency spectrum of the first audio signal by using the determined warping function.

The generating of the second audio signal may include performing inverse fast Fourier transform on the frequency spectrum of the first audio signal in which the frequency axis is transformed, and generating the second audio signal by overlapping, on a time axis, the frequency spectrum of the first audio signal that is inverse fast Fourier transformed on a time axis.

The extracting of the feature vector of the second audio signal may include determining an energy component for each filter bank by applying the filter bank distributed according to the preset scale to the frequency spectrum of the second audio signal segmented into the frame units, smoothing the determined energy component for each filter bank, and extracting the feature vector of the second audio signal based on the smoothed energy component for each filter bank.

Furthermore, according to an embodiment, a method of training, by an electronic apparatus, a voice recognition model includes obtaining a first audio signal segmented into a plurality of frame units to train the voice recognition model, obtaining a frequency spectrum of the first audio signal segmented into the frame units, transforming frequency axis of the frequency spectrum of the first audio signal to represent a variation of different vocal tract lengths of a plurality of speakers, generating a second audio signal by using the frequency spectrum of the first audio signal in which the frequency axis is transformed, extracting a feature vector of the generated second audio signal, and training the voice recognition model by using the extracted feature vector.

Furthermore, according to an embodiment, there is provided a computer-readable recording medium having recorded thereon a program for executing, on a computer, a method of recognizing user voice includes obtaining an audio signal segmented into a plurality of frame units, determining an energy component for each filter bank by applying a filter bank distributed according to a preset scale to a frequency spectrum of the audio signal segmented into the frame units, smoothing the determined energy component for each filter bank, extracting a feature vector of the audio signal based on the smoothed energy component for each filter bank, and recognizing the user voice in the audio signal by inputting the extracted feature vector to a voice recognition model.

Advantageous Effects of Disclosure

According to the voice recognition device and method according to the present disclosure, user voice may be efficiently recognized by using a small amount of data, and the user voice may be accurately recognized based on a smoothed energy component for each filter bank of an audio signal.

BRIEF DESCRIPTION OF DRAWINGS

FIG. 7 is a view of an energy component of a filter bank corresponding to a specific channel index, according to an embodiment;

BEST MODE

Figure 1:
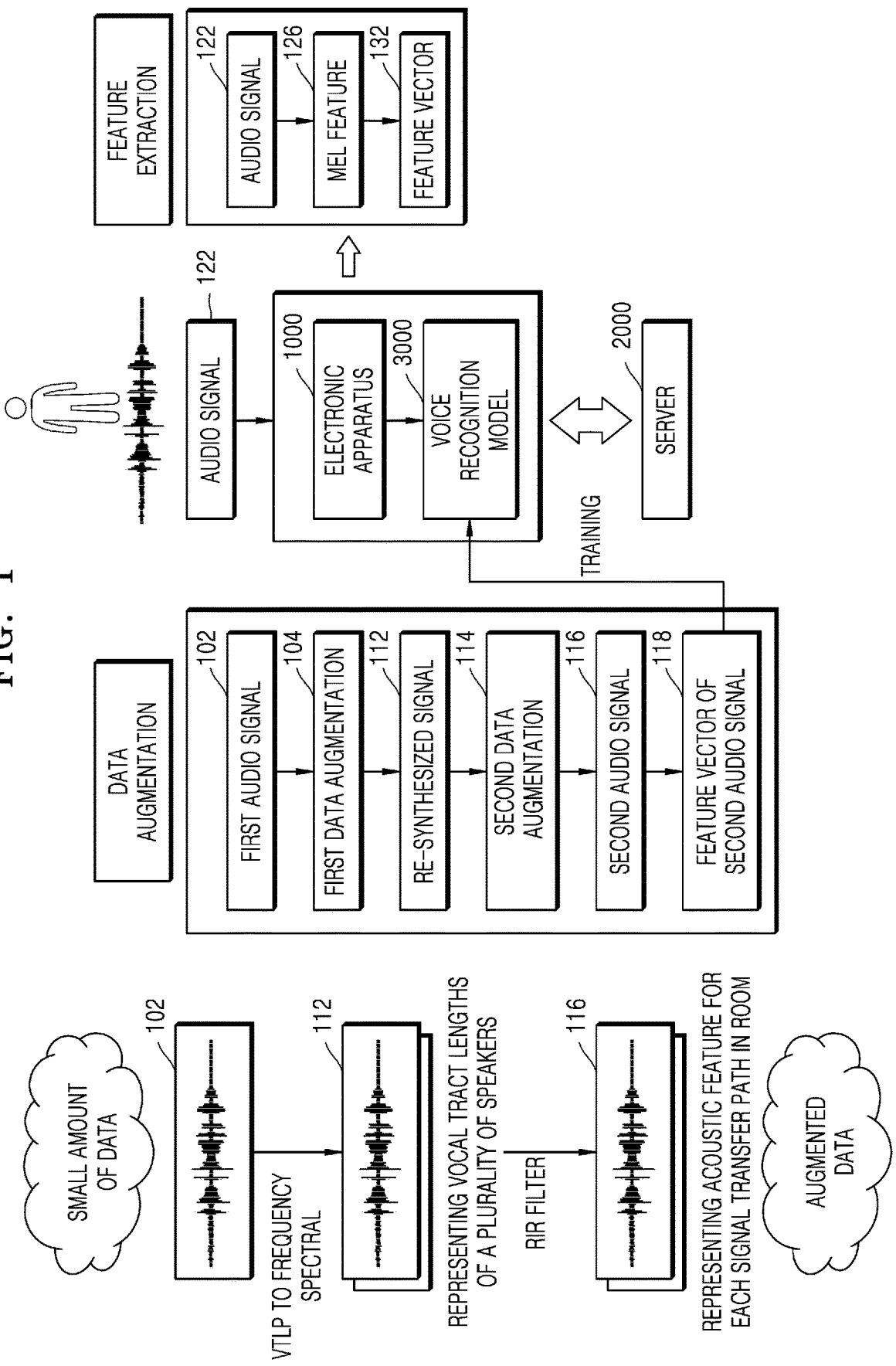
FIG. 1 is a schematic view of a method of recognizing, by an electronic apparatus, user voice and a method of processing an audio signal for voice recognition, according to an embodiment.

According to an embodiment, a method of recognizing user voice includes obtaining an audio signal segmented into a plurality of frame units, determining an energy component for each filter bank by applying a filter bank distributed according to a preset scale to a frequency spectrum of the audio signal segmented into the frame units, smoothing the determined energy component for each filter bank, extracting a feature vector of the audio signal based on the smoothed energy component for each filter bank, and recognizing the user voice in the audio signal by inputting the extracted feature vector to a voice recognition model.

Furthermore, according to an embodiment, an electronic apparatus for recognizing user voice includes a memory storing one or more instructions and a processor configured to execute the one or more instructions, in which the processor is further configured to, by executing the one or more instructions, obtain an audio signal segmented into a plurality of frame units, determine an energy component for each filter bank by applying a filter bank distributed according to a preset scale to a frequency spectrum of the audio signal segmented into the frame units, smooth the determined energy component for each filter bank, extract a feature vector of the audio signal based on the smoothed energy component for each filter bank, and recognize the user voice in the audio signal by inputting the extracted feature vector to a voice recognition model.

Furthermore, according to an embodiment, a method of processing an audio signal, by which an electronic apparatus trains a voice recognition model, includes obtaining a first audio signal segmented into a plurality of frame units to train the voice recognition model, obtaining a frequency spectrum of the first audio signal segmented into the frame units, transforming frequency axis of the frequency spectrum of the first audio signal to represent a variation of different vocal tract lengths of a plurality of speakers, generating a second audio signal by using the frequency spectrum of the first audio signal in which the frequency axis is transformed, and extracting a feature vector of the generated second audio signal.

Furthermore, according to an embodiment, a method of training, by an electronic apparatus, a voice recognition model includes obtaining a first audio signal segmented into a plurality of frame units to train the voice recognition model, obtaining a frequency spectrum of the first audio signal segmented into the frame units, transforming frequency axis of the frequency spectrum of the first audio signal to represent a variation of different vocal tract lengths of a plurality of speakers, generating a second audio signal by using the frequency spectrum of the first audio signal in which the frequency axis is transformed, extracting a feature vector of the generated second audio signal, and training the voice recognition model by using the extracted feature vector.

MODE OF DISCLOSURE

The terms used in the specification are briefly described and the disclosure is described in detail.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the contents discussed throughout the specification, not by their simple meanings.

When a part may "include" a certain constituent element, unless specified otherwise, it may not be construed to exclude another constituent element but may be construed to further include other constituent elements. Terms such as "-portion," "-unit," "-module," and the like stated in the specification may signify a unit to process at least one function or operation and the unit may be embodied by hardware, software, or a combination of hardware and software.

Embodiments are provided to further completely explain the disclosure to one of ordinary skill in the art to which the disclosure pertains. However, the disclosure is not limited thereto and it will be understood that various changes in form and details may be made therein without departing from the spirit and scope of the following claims. In the drawings, a part that is not related to a description is omitted to clearly describe the disclosure and, throughout the specification, similar parts are referenced with similar reference numerals.

FIG. 1 is a schematic view of a method of recognizing, by an electronic apparatus 1000, user voice and a method of processing an audio signal for voice recognition, according to an embodiment.

According to an embodiment, the electronic apparatus 1000 may include a voice recognition model 3000. For example, the electronic apparatus 1000 may obtain an audio signal 122, and user voice in the audio signal 122 may be recognized by inputting a feature vector 132 extracted from the obtained audio signal 122 to the voice recognition model 3000. The voice recognition model 3000 that the electronic apparatus 1000 uses to recognize user voice may be a model based on a neural network for auto speech recognition.

The electronic apparatus 1000 according to an embodiment may include smartphones, tablet PCs, PCs, smart TVs, mobile phones, personal digital assistants (PDAs), laptop computers, media players, servers, micro servers, global positioning system (GPS) devices, electronic book terminals, digital broadcasting terminals, navigation, kiosk, MP3 player, digital camera, speakers, other mobile or non-mobile computing devices, which include an AI program mounted thereon and a voice recognition function, but the disclosure is not limited thereto.

According to an embodiment, the electronic apparatus 1000 may recognize user voice in the audio signal 122, in association with a server 2000 that is connected to electronic apparatus via a network. According to an embodiment, the network may include a local area network (LAN), a wide area network (WAN), a value added network (VAN), a mobile radio communication network, a satellite communication network, and a combination thereof. The server 2000 connected to the electronic apparatus 1000 via the network may include at least one of different electronic apparatuses capable of communicating with the electronic apparatus 1000 according to the present disclosure.

According to an embodiment, the electronic apparatus 1000 may pre-train the voice recognition model 3000. For example, the electronic apparatus 1000 may augment an audio signal to train a voice recognition model according to at least one data augmentation technique, and train the voice recognition model based on an augmented audio signal. Furthermore, the electronic apparatus 1000 may smooth an energy component for each filter bank of a frequency spectrum of an audio signal including user voice, and input a feature vector extracted from a frequency spectrum of an audio signal including a smoothed energy component for each filter bank to the voice recognition model, thereby accurately recognizing user voice.

In the following description, a method of training, by the electronic apparatus 1000, a voice recognition model based on the augmented audio signal, and a method of recognizing user voice by inputting the feature vector extracted from the frequency spectrum of the audio signal including the smoothed energy component for each filter bank to the trained voice recognition model, are briefly described.

For example, the electronic apparatus 1000 may obtain a first audio signal 102 from a user, segment the first audio signal 102, and overlap segmented first audio signals at a predetermined interval, thereby obtaining the first audio signal 102 of a frame unit overlapping an adjacent frame at a predetermined interval. The first audio signal 102 may be a discrete signal that is obtained by sampling continuous signals at a preset sampling frequency.

The electronic apparatus 1000 may augment the first audio signal 102 by using a first data augmentation (104) technique. According to an embodiment, the electronic apparatus 1000 may augment an audio signal by applying vocal tract length perturbation (VTLP) to a frequency spectrum of an audio signal, not to a feature vector of the audio signal. In other words, the electronic apparatus 1000 may obtain audio data of speakers having augmented various vocal tract lengths based on a small amount of audio data, by applying VTLP to the frequency spectrum of the first audio signal 102, even when a small amount of audio data is obtained.

In detail, the electronic apparatus 1000 may obtain a frequency spectrum by performing a fast Fourier transform (FFT) on the first audio signal 102 that is segmented into frame units, and transforming frequency axis of the frequency spectrum (frequency warping) by using a warping function defined based on a warping coefficient to represent changes of different vocal tract lengths of a plurality of speakers.

According to an embodiment, the electronic apparatus 1000 may obtain the frequency spectrum by applying various interpolation algorithms between to FFT coefficients after performing the fast Fourier transform on the first audio signal 102. However, according to another embodiment, the electronic apparatus 1000 may obtain the frequency spectrum by performing oversize FFT on the first audio signal 102 based on an FFT size coefficient that is preset according to the number of samples to be upsampled. The frequency spectrum may indicate the size of a complex number for each frequency component of the first audio signal 102 that is fast Fourier transformed.

The electronic apparatus 1000 may obtain a signal of a time domain by performing an inverse FFT on the frequency spectrum obtained from the first audio signal 102 in which the frequency axis is transformed, and obtain a re-synthesized signal 112 by connecting signals of an obtained time domain. According to an embodiment, the electronic apparatus 1000 may perform inverse FFT on the frequency spectrum of the first audio signal in which the frequency axis is transformed, and overlap and add, on a time axis, the frequency spectrum of the first audio signal that is inverse fast Fourier transformed (Overlap Addition, 112), thereby obtaining a re-synthesized signal 112. However, the method of connecting, by the electronic apparatus 1000, signals of the time domain that is inverse fast Fourier transformed is not limited to the above-description, and various other methods to connect signals in a time domain may be used.

According to another embodiment, the electronic apparatus 1000 may augment the re-synthesized signal 112 by using a second data augmentation (114) technique. According to an embodiment, the electronic apparatus 1000 may apply, to a second audio signal 116, a room impulse filter, for example, a transfer function indicating acoustic feature for each transfer path as a room impulse response, indicating an acoustic feature for each transfer path of the audio signal, in a room in which the second audio signal 116 is transferred, and pre-train a voice recognition model based on a feature vector 118 extracted from the frequency spectrum of the second audio signal 16 to which the room impulse filter is applied. In other words, the electronic apparatus 1000 may obtain augmented data that represents a vocal tract length variation of a plurality of speakers by applying VTLP to the frequency spectrum of the first audio signal, apply a room impulse response (RIR) filter to the augmented data, and obtain pieces of further augmented data that represents a feature for each transfer path of an audio signal in a room of various environments.

Accordingly, even when obtaining a small amount of audio data, the electronic apparatus 1000 may train a voice recognition model based on the augmented data of a small amount of data, thereby improving user voice recognition accuracy.

Conventionally, general electronic apparatuses adjusted the position of a mel filter bank based on the warping function, not applying VTLP to the frequency spectrum, and extracted a mel feature based on an energy component for each mel filter bank whose position is adjusted. Accordingly, the general electronic apparatuses had difficulty in applying an RIR filter after extracting the mel feature, due to unidirectionality of energy conversion for each mel filter bank. However, according to an embodiment, as the electronic apparatus 1000 applies VTLP to the frequency spectrum before the extraction of a feature of an audio signal, the RIP filter may be further applied to the re-synthesized audio signal after the application of VTLP, and consequently the audio data may be effectively augmented.

Furthermore, when the electronic apparatus 1000 according to the disclosure augments an audio signal, to represent a vocal tract length variation of different speakers, the order of applying VTLP to the frequency spectrum of the audio signal and the RIR filter to the re-synthesized audio signal further matches a series of a transfer order of an audio signal until a voice signal of a speaker having a different vocal tract length in an actual room is received by a microphone. Accordingly, the electronic apparatus 1000 according to the disclosure may obtain the feature vector 118 by applying both of VTLP and RIR techniques to the first audio signal 102 according to the transfer order of an audio signal needed for actual voice recognition, and train a voice recognition model based on the obtained feature vector, thereby further improving voice recognition accuracy of the voice recognition model.

Furthermore, although not illustrated in FIG. 1, the electronic apparatus 1000 may obtain an energy component for each filter bank from the frequency spectrum of the second audio signal 116 obtained by augmenting the first audio signal, smooth the obtained energy component for each filter bank, and then train the voice recognition model 3000 based on the feature vector extracted based on the smoothed energy component for each filter bank. The electronic apparatus 1000 may smooth a mel filter bank energy component that is generally intensively distributed in a specific frequency area, and may train the voice recognition model 3000 based on the feature vector extracted from the frequency spectrum including a uniformly distributed energy component, thereby improving the voice recognition accuracy of the voice recognition model 3000.

When the electronic apparatus 1000 smooths the energy component for each filter bank of the second audio signal 116, and trains the voice recognition model 3000 by using the feature vector extracted based on the smoothed energy component for each filter bank, as described below, an energy component for each mel filter bank of a newly obtained audio signal 122 is smoothed, and the feature vector 132 extracted based on the smoothed energy component for each filter bank is input to the voice recognition model 3000, thereby recognizing the user voice in the audio signal 122.

The electronic apparatus 1000 may obtain the audio signal 122, and recognize user voice in the audio signal 122 obtained by using the voice recognition model 3000 that is pre-trained. For example, the electronic apparatus 1000 may obtained the audio signal 122 including user voice, and segment the obtained audio signal 122 into frame units, thereby obtaining the audio signal 122 that is segmented into frame units.

Furthermore, the electronic apparatus 1000 may extract a mel feature 126 by applying a mel filter bank distributed according to a preset scale to a frequency spectrum of an audio signal segmented into frame units, and input an audio feature vector including the extracted mel feature to the voice recognition model 3000, thereby recognizing the user voice in the audio signal.

Also, although not illustrated in FIG. 1, when the electronic apparatus 1000 smooths the energy component for each filter bank of the second audio signal 116, and uses the voice recognition model 3000 trained by using the feature vector extracted based on the smoothed energy component for each filter bank, the electronic apparatus 1000 may smooth the energy component for each mel filter bank of the newly obtained audio signal 122, and input the feature vector 132 extracted based on the smoothed energy component for each filter bank to the voice recognition model 3000, thereby recognizing the user voice in the audio signal 122.

Figure 2:
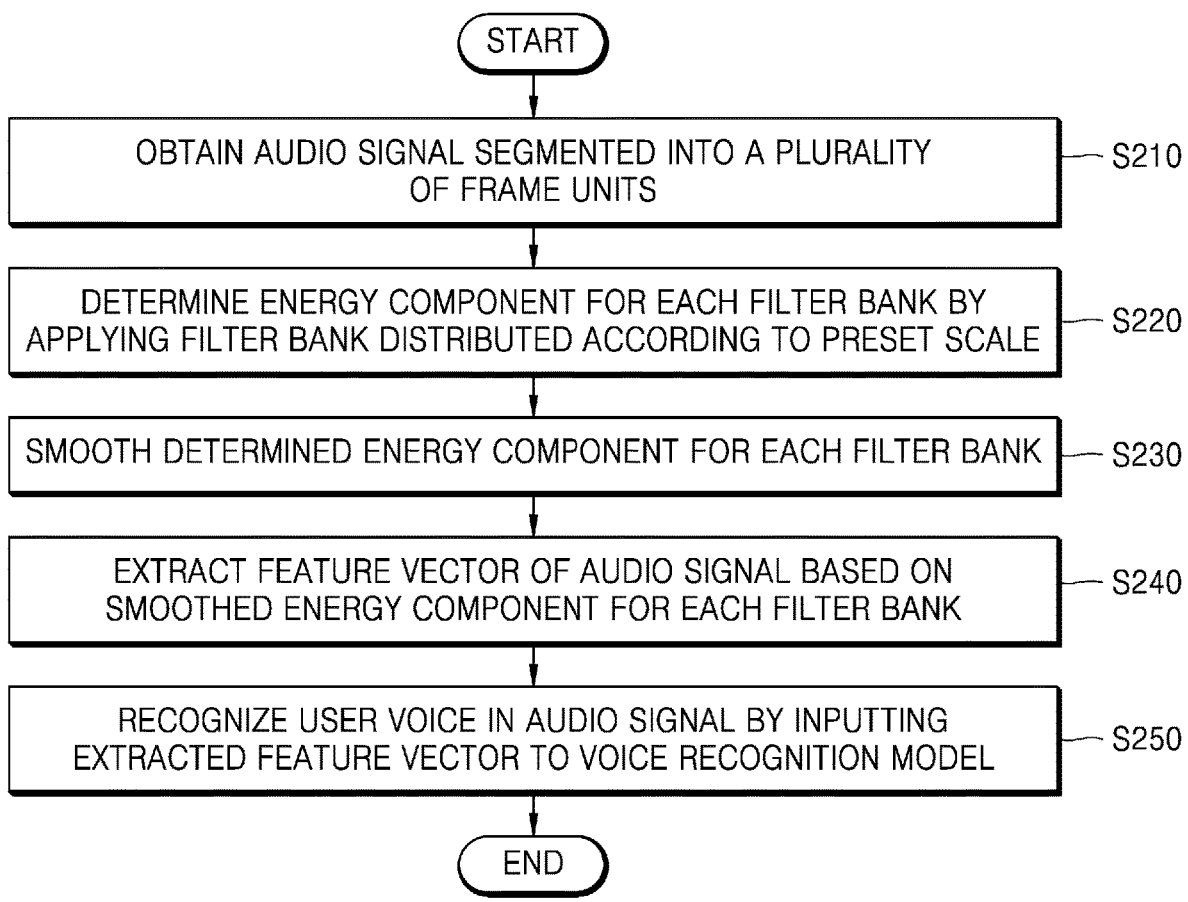
FIG. 2 is a flowchart of a method of recognizing, by the electronic apparatus, a user voice, according to an embodiment.

FIG. 2 is a flowchart of a method of recognizing, by the electronic apparatus 1000, user voice, according to an embodiment.

In S210, the electronic apparatus 1000 may obtain an audio signal segmented into a plurality of frame units. For example, the electronic apparatus 1000 may determine the window length of a certain window, and segment the audio signal into a plurality of frame units by using windows having a determined window length. Furthermore, the electronic apparatus 1000 may overlap the windows at a predetermined window interval, and segment the audio signal into a plurality of frame units by using the windows overlapped at a predetermined interval.

According to an embodiment, the window used by an electronic apparatus 1000 may be used, as a band pass filter, to remove noise included in a frequency component at each of both side edges in a frame. According to an embodiment, the window may include a Hanning window or a Hamming window, the disclosure is not limited thereto. Furthermore, the window length may be about 30 ms-about 50 ms, but the disclosure is not limited thereto, and the window length may vary according to the resolution of a target frequency spectrum.

Furthermore, according to an embodiment, the length of a window used when the electronic apparatus 1000 applies VTLP to the frequency spectrum of the first audio signal, the length of a window used when an RIR filter is adopted, and the length of a window used when actually obtained user voice in the audio signal is recognized after the training of a voice recognition model may different from one another. According to another embodiment, the length of a window used when the electronic apparatus 1000 applies VTLP to the frequency spectrum of the first audio signal may be different from the length of a window used when an RIR filter is adopted and the length of a window used when actually obtained user voice in the audio signal is recognized after the training of the voice recognition model In S220, the electronic apparatus 1000 may determine an energy component for each filter bank by applying a filter bank distributed according to a preset scale to the frequency spectrum of the audio signal. Although a preset scale used by the electronic apparatus 1000 to arrange a filter bank may include a log-scale or a mel-scale, the disclosure is not limited thereto, and the preset scale may further include other non-linearity scale to non-linearly distribute the filter bank based on person's auditory characteristics that better distinguish low frequencies.

According to an embodiment, the filter bank distributed according to a preset scale may mean a plurality of band pass filter arrays for dividing the frequency spectrum of the audio signal into a plurality of sub-band spectrums. Furthermore, the energy component for each filter bank may mean energy obtained by applying a filter bank to the frequency spectrum of the audio signal or a probability density function (PDF) of the energy.

In S230, the electronic apparatus 1000 may smooth an energy component for each filter bank determined by applying the filter bank distributed according to the preset scale to the frequency spectrum. The electronic apparatus 1000 may further accurately recognize user voice by inputting a feature vector including a uniformly distributed energy component to the voice recognition model. A method of smoothing, by the electronic apparatus 1000, an energy component for each filter bank is described below in detail with reference to FIGS. 4 and 5.

In S240, the electronic apparatus 1000 may extract the feature vector of the audio signal based on the smoothed energy component for each filter bank. According to an embodiment, the electronic apparatus 1000 may determine DCT coefficients by performing a discrete cosine transform (DCT) on the smoothed energy component for each filter bank, and extract a feature vector having, as an element, at least one of the determined DCT coefficients.

When the electronic apparatus 1000 uses all of the determined DCT coefficients according to the DCT, the performance of the voice recognition model may deteriorate due to a fast change of the filter bank energy. Accordingly, the electronic apparatus 1000 may improve the accuracy of voice recognition by removing some of the determined DCT coefficients and inputting a feature vector including the remaining DCT coefficients. According to an embodiment, the electronic apparatus 1000 may determine a feature vector based on the $2^{nd}$ to 13th DCT coefficients, but the disclosure is not limited thereto. However, the process of extracting, by the electronic apparatus 1000, an audio feature vector from the smoothed energy component for each filter bank is not limited to the method using the DCT coefficient, and the process may be performed based on other audio feature extracting methods.

For example, as the filter banks applied by the electronic apparatus 1000 to the frequency spectrum of the audio signal is in a state of being overlapped with each other in a frequency domain at a predetermined interval, energy component for each filter bank may be correlated to each other. Accordingly, the electronic apparatus 1000 may separate a correlation between the energies for each filter bank by performing a discrete cosine transform on the energy component for each filter bank, and input the extracted feature vector to the voice recognition model based on the separated independent energy for each filter bank (a band energy corresponding to a frequency band of a filter bank), thereby improving the accuracy of voice recognition.

In S250, the electronic apparatus 1000 may recognize the user voice in the audio signal by inputting the extracted feature vector to the voice recognition model. When the electronic apparatus 1000 inputs the extracted feature vector to the voice recognition model, a method of recognizing user voice based on a probability value of a label including certain text information is described below in detail with reference to FIG. 18.

Figure 3:
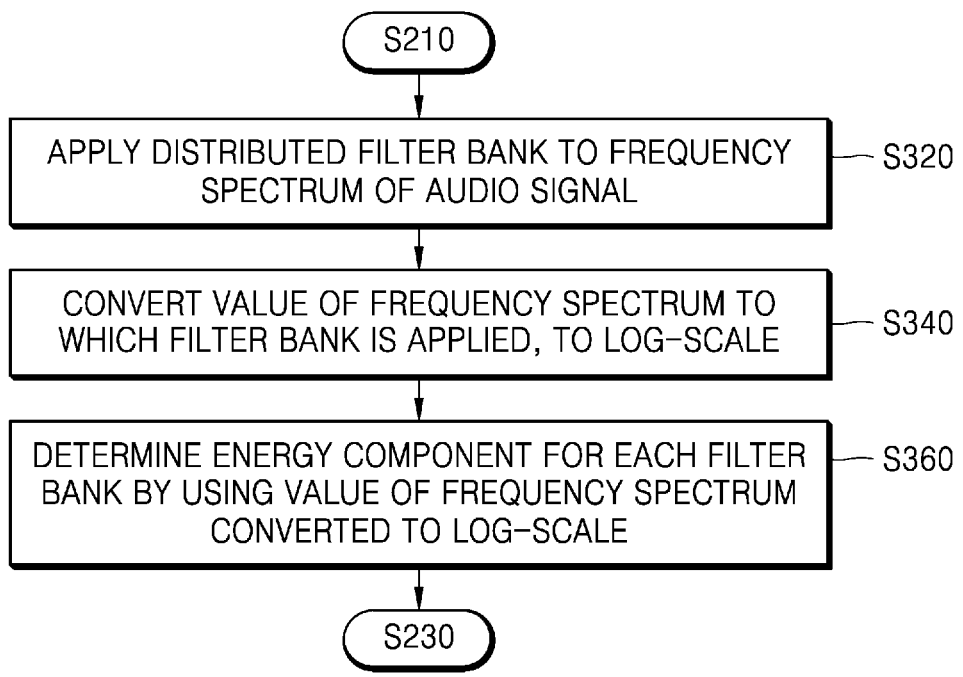
FIG. 3 is a flowchart of a method of determining, by the electronic apparatus, an energy component for each filter bank, according to an embodiment.

FIG. 3 is a flowchart of a method of determining, by the electronic apparatus 1000, an energy component for each filter bank, according to an embodiment.

In S320, the electronic apparatus 1000 may apply the distributed filter bank to the frequency spectrum of the audio signal. For example, an operation of multiplying, by the electronic apparatus 1000, in a frequency domain, a function for each channel of the filter bank distributed according to the preset scale and a function of the frequency spectrum corresponding to the frequency band of the filter bank may correspond to the operation of applying, by the electronic apparatus 1000, the distributed filter bank to the frequency spectrum of the audio signal.

In S340, the electronic apparatus 1000 may convert a value of the frequency spectrum to which the filter bank is applied, to a log-scale. The electronic apparatus 1000 may apply a log function to each frequency spectrum to represent person's auditory characteristics, not linear-scale, thereby converting the value of the frequency spectrum to which the filter bank is applied, to a log-scale.

In S360, the electronic apparatus 1000 may determine the energy component for each filter bank by using the value of the frequency spectrum transformed to a log-scale. For example, the electronic apparatus 1000, as in S320, may square the product of the function for each channel of the filter bank distributed according to the preset scale and the function of the frequency spectrum corresponding to the frequency band of the filter bank, and apply a log function to a squared result, thereby determining the energy component for each filter bank.

Figure 4:
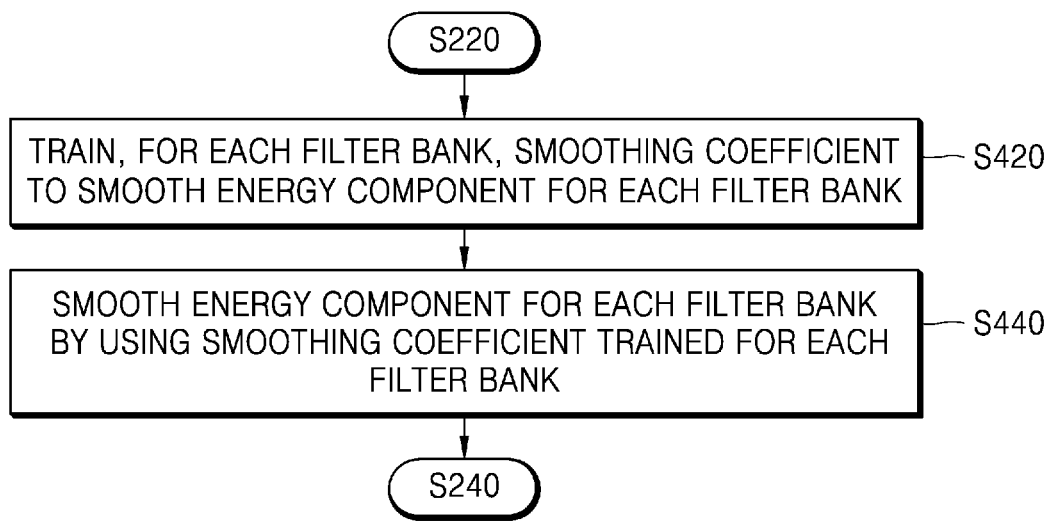
FIG. 4 is a flowchart of a method of smoothing, by the electronic apparatus, an energy component for each filter bank by using a pre-trained smoothing coefficient, according to an embodiment.

FIG. 4 is a flowchart of a method of smoothing, by the electronic apparatus 1000, an energy component for each filter bank by using a pre-trained smoothing coefficient, according to an embodiment.

In S420, the electronic apparatus 1000 may train, for each filter bank, a smoothing coefficient to smooth an energy component for each filter bank. According to an embodiment, the electronic apparatus 1000 may extract a feature vector, for example, a feature according to a log-mel or MFCC based on the energy component for each filter bank generated by applying the filter bank distributed according to a log-scale or a mel-scale to the frequency spectrum of an audio signal, to represent a non-linearity feature of intensity between energies of a filter bank that is perceived by a person.

According to another embodiment, to represent a relation of the intensity between the energies of a filter bank that is perceived by a person, the electronic apparatus 1000 may smooth values of all energies for each filter bank by using a power-function having a smoothing coefficient having a value of 1/15 as an exponent of power, and extract a feature vector, for example, a feature according to a power-normalized cepstral coefficient (PNCC), based on the smoothed energy component for each filter bank.

However, the electronic apparatus 1000 according to the disclosure may smooth a value of energy for each filter bank by training a smoothing coefficient for each filter bank and using a power-function having a trained smoothing coefficient as an exponent of a power, to represent the non-linearity feature of the intensity between the energies of a filter bank that is perceived by a person. The smoothing coefficient according to the disclosure may include a power-coefficient that is an exponent of a power of a power-function. In the following description, a process of training, by the electronic apparatus 1000, a smoothing coefficient for each filter bank is described in detail. First, a uniformly distributed variable Y is defined based on Equation 1 below.

$$Y = \sigma_p(X) = (X - x_{min})^\alpha \qquad \text{Equation 1}$$

Y is a target uniformly distributed variable, X is a random variable between $x_{max}$ and $x_{min}$, $\sigma_p(X)$ is a non-linearity function having a variable X as an input, and $\alpha$ is a smoothing coefficient. An interval of the uniformly distributed variable Y may be defined to be that $I_Y = [0, (x_{max} - x_{min})^\alpha]$ based on the minimum and maximum values of the variable X. IY is an interval of the uniformly distributed variable Y, $x_{max}$ and $x_{min}$ are maximum and minimum values of the interval of the variable X, and $\alpha$ is a smoothing coefficient. According to the interval of the uniformly distributed variable Y, the uniformly distributed variable Y is defined again as in Equation 2 by using a uniform function below.

$$Y \sim \mu(0, (X - x_{min})^\alpha) \qquad \text{Equation 2}$$

As shown in Equation 2, the uniformly distributed variable Y may be defined by using a uniform function $\mu( )$ having an input $(X - x_{min})^\alpha$ at 0. Assuming that the uniformly distributed variable Y follows a uniform distribution, the PDF of the uniformly distributed variable Y may be expressed by Equation 3 below.

$$pY(y) = \begin{cases} \dfrac{1}{(x_{max} - x_{min})^\alpha}, & 0 \leq y \leq (x_{max} - x_{min})^\alpha \\ 0, & \text{otherwise} \end{cases} \qquad \text{Equation 3}$$

pY(y) is the PDF of the uniformly distributed variable Y, and the PDF of the uniformly distributed variable Y is a uniformly distributed $$\dfrac{1}{(x_{max} - x_{min})^\alpha}$$

value in a range that $0 \leq y \leq (x_{max} - x_{min})^\alpha$ and may have a probability density of 0 in other ranges. With respect to the PDF of the uniformly distributed variable Y defined as in Equation 3, the PDF of the random variable X selected between xmax and xmin is defined as follows.

$$\begin{aligned} pX(x) &= pY(y)\dfrac{dy}{dx} \\ &= pY(y)[\alpha(x - x_{min})^{\alpha-1}] \\ &= \begin{cases} \dfrac{\alpha(x - x_{min})^{\alpha-1}}{x_{max} - x_{min}^\alpha}, & x_{min} \leq x \leq x_{max} \\ 0, & \text{otherwise} \end{cases} \end{aligned} \qquad \text{Equation 4}$$

To obtain the PDF pX(x) of the variable X with respect to the PDF of the uniformly distributed variable Y, pY(Y) is differentiated with respect to x. By differentiating pY(y) with respect to x, the PDF to the variable X may have a value $$\dfrac{\alpha(x - x_{min})^{\alpha-1}}{x_{max} - x_{min}^\alpha}$$

in a range that $x_{min} \leq x \leq x_{max}$ and may indicated a value 0 in other ranges. In Equation 4, the variable X may be defined as expressed by Equation 5 below.

$$X = \{x_0, x_1, \ldots x_{N-1}\} \quad \text{Equation 5}$$

In other words, the variable X may be expressed by a vector including a total N random variables from 0 to N−1. In order to determine a smoothing coefficient α that maximizes a log likelihood of the PDF of the variable X (maximum likelihood estimation (MLE)), a likelihood function to the variable X is defined as follows.

$$L(\alpha \mid X) = \sum_{i=0}^{N-1} lnpx(x_i) \quad \text{Equation 6}$$

$$= \sum_{i=0}^{N-1} \ln\left[\frac{\alpha(x_i - x_{min})^{\alpha-1}}{(x_{max} - x_{min})^{\alpha}}\right]$$

$$= N\ln(\alpha) + (\alpha - 1)\sum_{i=0}^{N-1} \ln(x_i - x_{min}) - N\alpha\ln(x_{max} - x_{min}).$$

$L(\alpha|X)$ is a log likelihood to the smoothing coefficient α of the variable X, and $px(x_i)$ is the PDF of the i-th variable X. $L(\alpha|X)$ may be expressed by three log terms as in Equation 6, and the last log term $\ln(x_i - x_{min})$ may not be defined in $x_i = x_{min}$. Accordingly, $(\alpha|X)$ in $x_i = x_{min}$ may be expressed by using a flooring coefficient δ.

$$L(\alpha \mid X) = \quad \text{Equation 7}$$

$$N\ln(\alpha) + (\alpha - 1)\sum_{i=0}^{N-1} \ln(\max\{x_i - x_{min}, \delta\}) - N\alpha\ln(x_{max} - x_{min})$$

$L(\alpha|X)$ is a log likelihood to the smoothing coefficient α of the variable X, and when the variable x is that $x_i = x_{min}$, the log term may be expressed by using the flooring coefficient δ to be that $$(\alpha - 1)\sum_{i=0}^{N-1} \ln(\max\{x_i - x_{min}, \delta\}) - N\alpha\ln(x_{max} - x_{min}).$$

According to an embodiment, the flooring coefficient may be 10^−100, but the disclosure is not limited thereto. To determine a maximum likelihood to the smoothing coefficient α, $L(\alpha|X)$ is differentiated with respect to the smoothing coefficient α. Accordingly, the smoothing coefficient α̂ a to maximize the log likelihood to the smoothing coefficient α of the variable X is as follows.

$$\hat{\alpha} = \frac{1}{\ln(x_{max} - x_{min}) - \frac{1}{N}\sum_{i=0}^{N-1} \ln(\max\{x_i - x_{min}, \delta\})} \quad \text{Equation 8}$$

α̂, as the smoothing coefficient to maximize the log likelihood to the smoothing coefficient α of the variable X, may be expressed by Equation 8 by using the maximum value $x_{max}$, the minimum value $x_{min}$, and the flooring coefficient δ of the interval of the variable X.

In other words, as in Equations 1 to 8, assuming the uniformly distributed target variable Y, the electronic apparatus 1000 may determine the log likelihood of the current variable X to the target variable Y, and determine the smoothing coefficient according to whether the determined log likelihood is maximized. In Equations 1 to 8, the target variable Y may correspond to the uniformly distributed energy component for each filter bank, and the variable X may correspond to the energy component for each filter bank of a currently received audio signal.

For example, the electronic apparatus 1000 may determine the log likelihood of an energy component for each filter bank, for example, the PDF of energy for each filter bank, of a currently received audio signal, with respect to the uniformly distributed energy component for each filter bank, for example, the PDF of energy for each filter bank, and determine the smoothing coefficient according to whether the log likelihood is maximized. In other words, the electronic apparatus 1000 may receive an audio training signal, and pre-train a smoothing coefficient for each filter bank, based on whether the log likelihood of the energy component for each filter bank of the audio training signal is maximized, with respect to the uniformly distributed energy component for each filter bank. In other words, the smoothing coefficient that the electronic apparatus 1000 trains for each filter bank may have a different value for each filter bank, unlike a PNCC feature extraction method in which the same smoothing coefficient of 1/15 is applied to each of all filter bank to represent the non-linearity feature of the intensity between the energies of a filter bank that is perceived by a person. A smoothing coefficient that is trained to be different from each other for each filter bank is described below with reference to FIG. 5.

Figure 5:
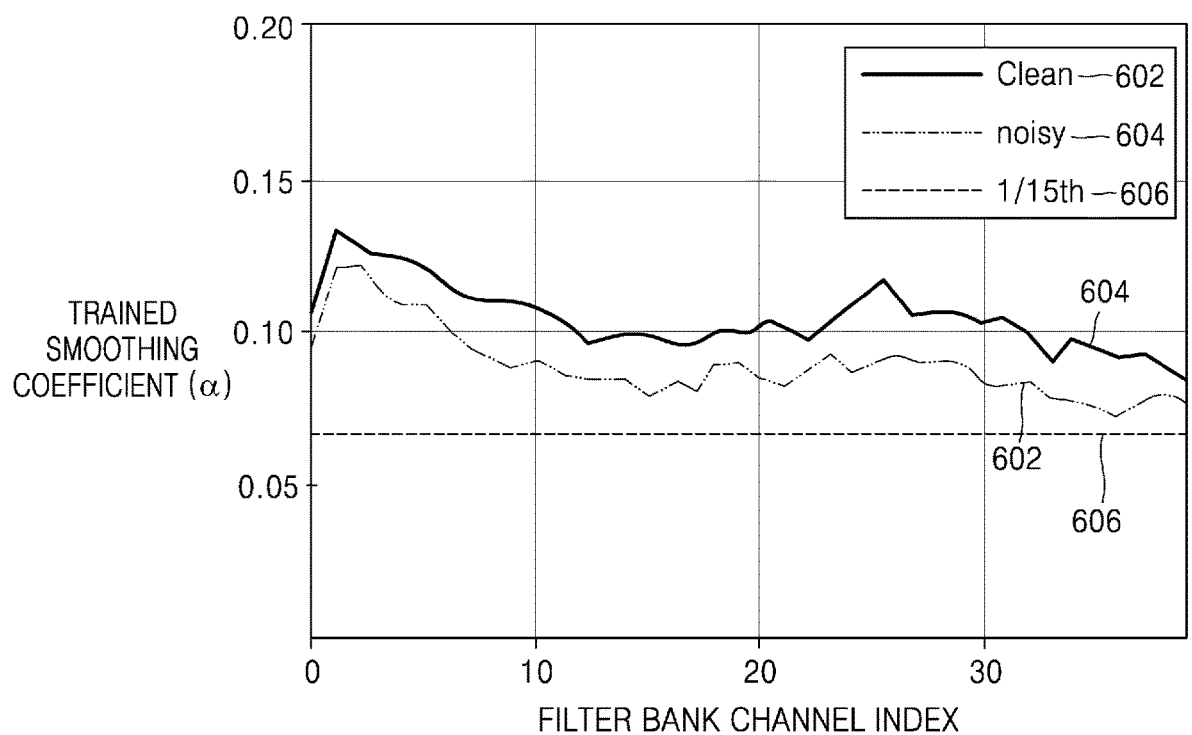
FIG. 5 is a view for describing a smoothing coefficient trained for each filter bank channel.

FIG. 5 is a view for describing a smoothing coefficient trained for each filter bank channel.

Unlike a PNCC in which a smoothing coefficient 606 of the same value, for example, 1/15, is applied to all of each filter bank, the electronic apparatus 1000 according to the disclosure may train a different smoothing coefficient for each filter bank having a different channel.

For example, the electronic apparatus 1000 may receive an audio training signal that does not include a noise signal, and train a smoothing coefficient 602 to maximize the log likelihood of the energy component for each filter bank of the audio training signal, with respect to the uniformly distributed energy component for each filter bank.

Furthermore, the electronic apparatus 1000 may receive an audio training signal including a noise signal, and may train a smoothing coefficient 604 to maximize the log likelihood of the energy component for each filter bank of the audio training signal, with respect to the uniformly distributed energy component for each filter bank.

In other words, although, as illustrated in FIG. 5, the electronic apparatus 1000 may determine the same smoothing coefficient for each filter bank channel, for example, 1/15, to represent the non-linearity feature of the intensity between the energies of a filter bank that is perceived by a person, the electronic apparatus 1000 may train a different smoothing coefficient for each filter bank based on an audio training signal that does not to include a noise signal or an audio training signal that includes a noise signal. The electronic apparatus 1000 according to the disclosure may more accurately recognize user voice by smoothing an energy component for each filter bank of a currently received audio signal by using a smoothing coefficient differently trained for each filter bank.

Figure 6:
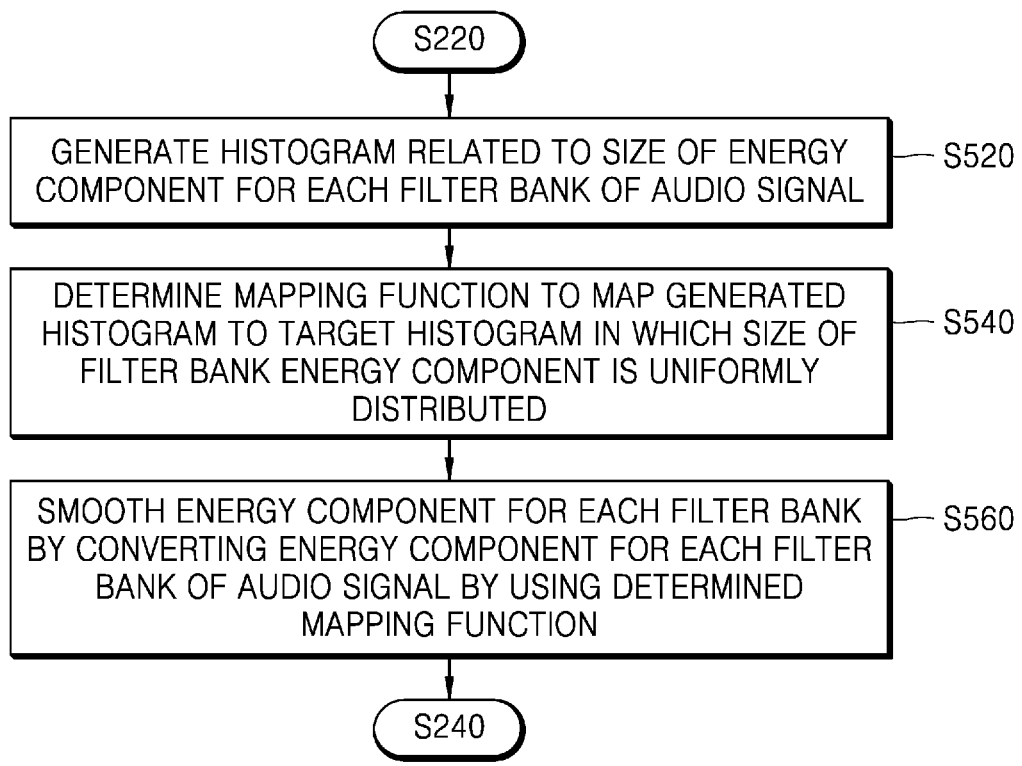
FIG. 6 is a flowchart of a method of smoothing, by the electronic apparatus, an energy component for each filter bank by using a mapping function to map a target histogram, according to an embodiment.

FIG. 6 is a flowchart of a method of smoothing, by the electronic apparatus 1000, an energy component for each filter bank by using a mapping function to map a target histogram, according to an embodiment.

The electronic apparatus 1000, unlike FIGS. 4 to 5, may obtain an energy component for each filter bank by applying a distributed filter bank to the frequency spectrum of an audio signal, generate a histogram related to the size of the obtained energy component for each for each filter bank, and smooth the energy component for each filter bank of an audio signal, based on a mapping function to map the generated histogram to a target histogram.

In detail, in S520, the electronic apparatus 1000 may obtain an energy component for each filter bank by applying a filter bank to the frequency spectrum of an audio signal, and generate a histogram related to the size of the obtained energy component for each filter bank. For example, the electronic apparatus 1000 may segment the size of the energy component for each filter bank of an audio signal into a certain frequency domain (bin), and generate a histogram based on the size of a filter bank energy component for each segmented frequency domain. The frequency component may include a unit frequency domain or a frequency bin.

According to another embodiment, the electronic apparatus 1000 may generate a histogram based on a frequency for each frequency component of an energy component for each filter bank. For example, the electronic apparatus 1000 may segment a frequency spectrum of the obtained energy component for each filter bank, for example, the PDF of energy for each filter bank, into a certain frequency domain (bin) by applying a filter bank to an audio signal, and generate a histogram based on a frequency of a spectrum value occurring for each segmented frequency domain.

In S540, the electronic apparatus 1000 may determine a mapping function to map the generated histogram to a target histogram in which the size for each frequency component is uniformly distributed. The target histogram may indicate the size for each frequency component in the energy component for each filter bank of an audio signal, assumed to obtain a value of the energy for each filter bank of the audio signal in which the energy component for each filter bank is uniformly distributed. The mapping function may be determined from Equation 9 below.

$$Y = \sigma_{np}(X) = F_u^{-1}(\widetilde{F_x}(X))$$

Equation 9

$\sigma_{np}(X)$ is a non-linearity function having the histogram of the variable X as an input, to map the histogram of the variable X, for example, the PDF of the energy component for each filter bank, to the histogram of the variable Y, $F_u(\cdot)$ is a probability density function of the uniformly distributed target histogram and also a cumulative distribution function (CDF) of $\widetilde{F_x}^{-1}(\cdot)$, and $F_u^{-1}$ is a mapping function to map the histogram of the variable X to the target histogram.

In S560, the electronic apparatus 1000 may convert the energy component for each filter bank of an audio signal by using the determined mapping function. For example, the electronic apparatus 1000 may input a filter bank energy value for each frequency component in the filter bank energy component of a currently received audio signal to the mapping function, and obtain the filter bank energy value to allow the size or frequency for each frequency component to indicate the target histogram based on a result of an output of the mapping function, thereby converting the energy component for each filter bank of a currently received audio signal. The electronic apparatus 1000 may smooth the energy component for each filter bank of an audio signal by converting the energy component for each filter bank of an audio signal by using the mapping function. The electronic apparatus 1000 may extract the feature vector of the audio signal based on the smoothed energy component for each filter bank, and recognize user voice in the audio signal by using the extracted audio feature vector, thereby accurately recognizing the user voice. As S560 may correspond to S220 to S230 of FIG. 2, a detailed description thereof is omitted.

FIG. 7 is a view of an energy component of a filter bank corresponding to a specific channel index, according to an embodiment.

Referring to FIG. 7, among the filter banks distributed by the electronic apparatus 1000 according to a mel-scale, a PDF of mel filter bank energy obtained by applying a filter bank having a channel index of 3 to a frequency spectrum is illustrated.

For example, when the electronic apparatus 1000 does not smooth the PDF of mel filter bank energy as described in FIGS. 4 and 6 above (702), the electronic apparatus 1000 may obtain the PDF of mel filter bank energy intensively distributed at around a frequency domain of 0 Hz. When the electronic apparatus 1000 uses a feature vector extracted from the frequency spectrum including an energy component that is not uniformly distributed, the accuracy of voice recognition by the electronic apparatus 1000 may deteriorate.

However, according to an embodiment, when the electronic apparatus 1000 smooths the PDF of filter bank energy having a channel index 1=3 by using a pre-trained smoothing coefficient (704), the PDF of filter bank energy similar to a normal distribution shape from −1 to 1 may be obtained. According to another embodiment, when the electronic apparatus 1000 smooth the PDF of filter bank energy having a channel index 1=3 by using a histogram-based mapping function (706), the PDF of filter bank energy that is uniformly distributed may be obtained. The electronic apparatus 1000 may accurately recognize user voice in the audio signal by smoothing the energy for each filter bank PDF of an audio signal.

Figure 8:
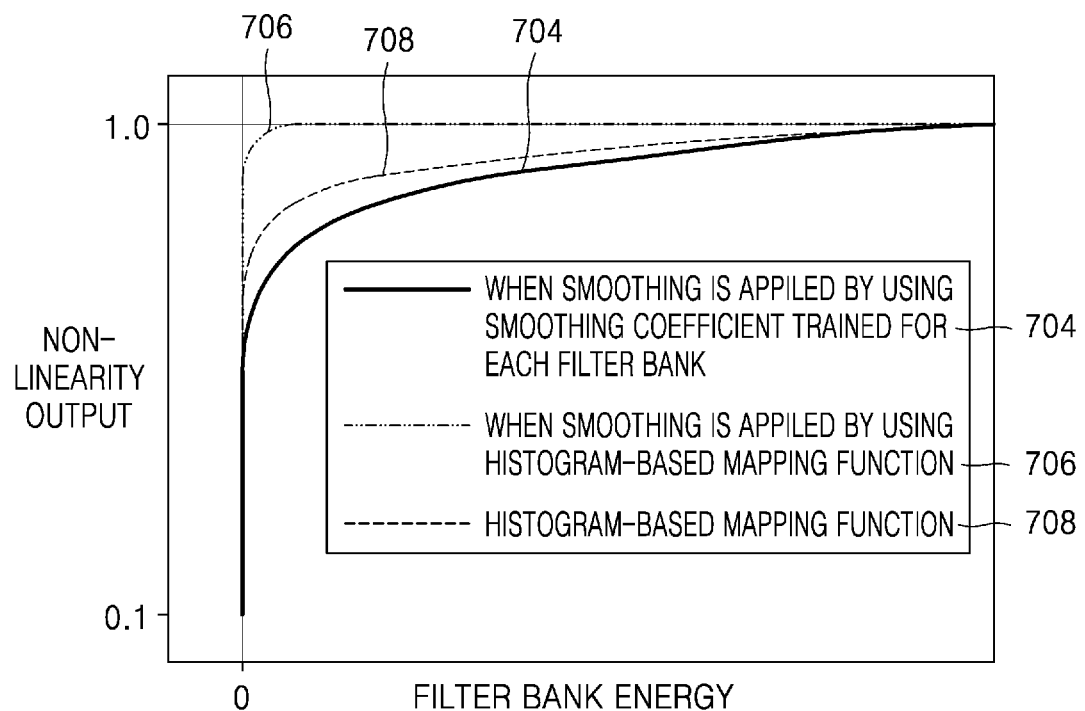
FIG. 8 is a view of a non-linearity output with respect to filter bank energy, according to an embodiment.

FIG. 8 is a view of a non-linearity output with respect to filter bank energy, according to an embodiment.

Although the electronic apparatus 1000 may apply the same smoothing coefficient $\frac{1}{15}$ to the energy component for each filter bank of an audio signal (708) to represent person's auditory characteristics indicating a non-linearity feature, the electronic apparatus 1000 may apply a smoothing coefficient differently trained for each filter bank to the energy component for each filter bank of an audio signal (704), by training, for each filter bank, a smoothing coefficient that maximizes a log likelihood of the energy component for each filter bank of a currently received audio signal with respect to the uniformly distributed energy component for each filter bank. Furthermore, the electronic apparatus 1000 may generate a histogram related to the size of a frequency spectrum of an audio signal for each frequency component, and smooth the energy component for each filter bank of an audio signal based on a mapping function to map the generated histogram to a target histogram (706).

When the electronic apparatus 1000 smooths the energy component for each filter bank of an audio signal by using the smoothing coefficient trained for each filter bank (704), as an energy component of a filter bank decreases, a non-linearity output may be sharply decreased compared to a case in which the energy component for each filter bank is smoothed by using the same smoothing coefficient $\frac{1}{15}$ (708). However, when the electronic apparatus 1000 smooths the energy component for each filter bank by using a histogram-based mapping function (706), the non-linearity output may be maintained uniform regardless of a change of the energy component of a filter bank. The non-linearity output may indicate a degree of the non-linearity feature of the energy for each filter bank to represent the person's auditory characteristics indicating the non-linearity feature.

Figure 9:
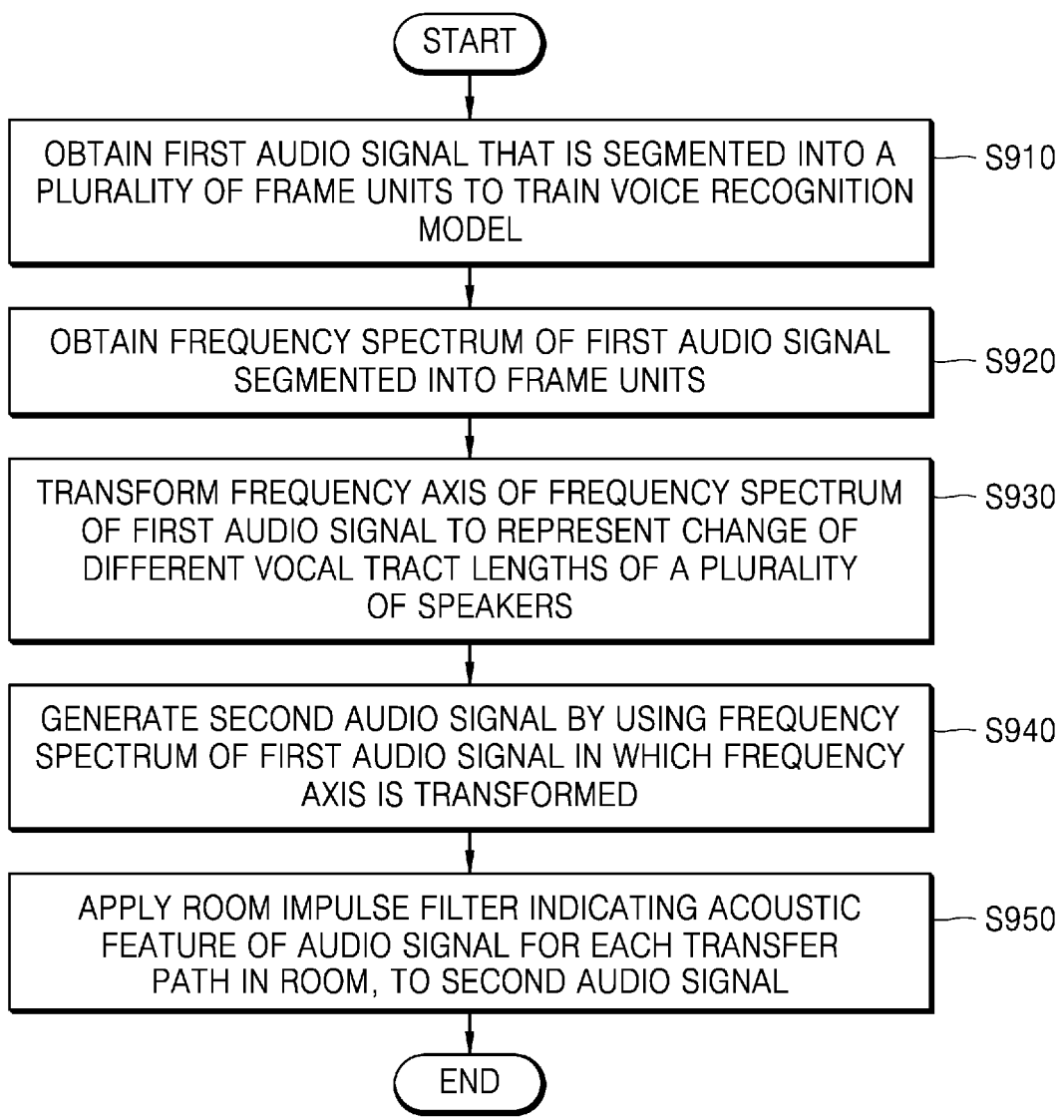
FIG. 9 is a flowchart of a method of processing, by the electronic apparatus, an audio signal for voice recognition model training, according to an embodiment.

FIG. 9 is a flowchart of a method of processing, by the electronic apparatus 1000, an audio signal for voice recognition model training, according to an embodiment.

The electronic apparatus 1000 may obtain an audio signal and input a feature vector extracted from the audio signal to a pre-trained voice recognition model, thereby recognizing the user voice in the audio signal. In the following description, a method of processing, by the electronic apparatus 1000, an audio signal to pre-train a voice recognition model is described.

In S910, the electronic apparatus 1000 may obtain a first audio signal segmented into a plurality of frame units to train a voice recognition model. For example, the electronic apparatus 1000 may arrange Hanning windows having a preset window length to overlap at a predetermined interval, and obtain a first audio signal segmented into a plurality of frame units by using the Hanning windows arranged to overlap each other. According to an embodiment, the length of the Hanning window may be about 50 ms, but the disclosure is not limited thereto, and the length of the Hanning window may vary according to a target frequency resolution. As S910 may correspond to the obtaining of an audio signal segmented into a plurality of frame units by the electronic apparatus 1000 of FIG. 2, a detailed description thereof is omitted.

In S920, the electronic apparatus 1000 may obtain a frequency spectrum of the first audio signal that is segmented into a plurality of frame units. For example, the electronic apparatus 1000 may obtain a first audio signal of a plurality of frame units sampled with a sample number of K=1024, at a frequency of 16 Khz. The electronic apparatus 1000, to obtain a better frequency resolution during transforming the frequency axis (frequency warping), may set an oversize FFT coefficient U to 16, upsample the first audio signal according to the set oversize FFT coefficient U, and perform FFT on the upsampled first audio signal, thereby obtaining a frequency spectrum. When the audio signal, in which the frequency axis is transformed (frequency warped), of a spectrum having an FFT size coefficient of K is $Y_K[m,e^{jw_k}]$, a relationship to a spectrum $X_{UK}[m,e^{jV_k}]$ of the original signal, before transforming the frequency axis, having an FFT size coefficient UK is expressed by Equation 10.

$$Y_K[m, e^{jw_k}] = X_{UK}[m, e^{jv_{k_0}}] \qquad \text{Equation 10}$$
$$= X_{UK}[m, e^{j\emptyset_\alpha(w_k)}], 0 \le k \le \frac{K}{2}$$

m denotes a frame index of the audio signal obtained by the electronic apparatus 1000, $\emptyset_\alpha(w_k)$ denotes a warping function, a discrete time frequency is $$w_k = \frac{2\pi k}{K},$$

a discrete time frequency is $$v_{k_0} = \frac{2\pi k_0}{UK},$$

denotes an oversize FFT size coefficient, and K denotes an FFT size coefficient.

Considering symmetry of the frequency spectrum of an audio signal in which the frequency axis is transformed, the spectrum of the audio signal in which the frequency axis is transformed may be defined to be $Y(e^{jw_k})$ within a range that $$0 \le k \le \frac{K}{2}.$$

In obtaining $Y_K[m,e^{jw_k}]$, of Equation 10, as the spectrum $X_{UK}[m,e^{jV_k}]$ of the original signal before transforming the frequency axis may be defined with respect to a discrete value k only, $\emptyset_\alpha(w_k)$ may be indicated with respect to $v_{k_0}$ by using a certain integer $k_0$. As $v_{k_0}$ is defined such that $$v_{k_0} = \frac{2\pi k_0}{UK},$$

the warping function $\emptyset_\alpha(w_k)$ may be defined as shown in Equation 11.

$$\frac{2\pi k_0}{UK} \approx \emptyset_\alpha(w_k). \qquad \text{Equation 11}$$

U denotes an oversize FFT coefficient, K denotes an FFT size coefficient, and $\emptyset_\alpha(w_k)$ denotes a warping function. Accordingly, in Equation 11, $k_0$ is defined as shown in Equation 12.

$$K_0 \approx \frac{UK\emptyset_\alpha(w_k)}{2\pi} \qquad \text{Equation 12}$$

In Equation 12, $k_0$ may be rounded up by Equation 13 below.

$$K_0 = \left\lfloor \frac{UK\emptyset_\alpha(w_k)}{2\pi} + 0.5 \right\rfloor \qquad \text{Equation 13}$$

U denotes an oversize FFT coefficient, K denotes an FFT size coefficient, $\emptyset_\alpha(w_k)$ denotes a warping function, and $\lfloor \cdot \rfloor$ is a floor operator to obtain the maximum integer less than or equal to an input value in the function. 0.5 is a constant added for rounding after the decimal point. The audio signal in which the frequency axis is transformed (frequency warped) may be defined to be $Y_K[m,e^{jw_k}]$ as shown in Equation 14 below, by using Equations 10 and 13.

$$Y_K[m, e^{jw_k}] = X_{UK}[m, e^{jv_{k_0}}] \qquad \text{Equation 14}$$
$$= X_{UK}\left[m, e^{jv\left\lfloor \frac{UK\emptyset_\alpha(w_k)}{2\pi} + 0.5 \right\rfloor}\right], 0 \le k \le \frac{K}{2}$$

$Y_K[m,e^{jw_k}]$ denotes the spectrum of the audio signal in which the frequency axis is transformed, $X_{UK}[m,e^{jV_k}]$ denotes the spectrum of the original signal before transforming the frequency axis, a discrete time frequency is $$w_k = \frac{2\pi k}{K},$$

and a discrete time frequency is $$v_{k_0} = \frac{2\pi k_0}{UK}.$$

In S930, to represent a change of different vocal tract lengths of a plurality of speakers, the electronic apparatus 1000 may transform frequency axis of the frequency spectrum of the first audio signal by using the warping function $\emptyset_\alpha(w_k)$ defined in Equations 10 and 14. For example, the electronic apparatus 1000 may transform frequency axis of the frequency spectrum of the first audio signal (108) by using a warping coefficient and a warping function defined based on the warping coefficient. A method of performing, by the electronic apparatus 1000, transforming frequency axis of the frequency spectrum of the first audio signal is described below in detail with reference to FIGS. 11 and 12.

In S940, the electronic apparatus 1000 may generate a second audio signal by using the frequency spectrum of the first audio signal in which the frequency axis is transformed. For example, the electronic apparatus 1000 may perform an inverse FFT on the frequency spectrum of the first audio signal in which the frequency axis is transformed, and overlap and add, on a time axis, the frequency spectrum of the first audio signal that is inverse fast Fourier transformed (112), thereby obtaining a re-synthesized second audio signal 116.

In S950, the electronic apparatus 1000 may apply a room impulse filter indicating an acoustic feature of the audio signal for each transfer path in the room, to the second audio signal. For example, the room impulse filter, as a transfer function, may be a room impulse response. For example, the room impulse filter may indicate different acoustic features of the audio signal for each transfer path in the room.

The acoustic feature indicated by the room impulse filter may include a reverberation time (wide distribution of reverberation) for each transfer path in the room, a room dimension of an audio signal for each transfer path, and a signal to noise ratio for each transfer path in the room, but the disclosure is not limited thereto. Also, a transfer path of an audio signal in the room may be defined based on a sound source for generating an audio signal and the position of a microphone for receiving the audio signal.

The operation of applying, the electronic apparatus 1000, a room impulse filter to the second audio signal may correspond to an operation of convoluting the room impulse response with the second audio signal in a time domain or an operation of multiplying the second audio signal by the room impulse response in a frequency domain. The electronic apparatus 1000 may simulate a situation in which an audio signal is transmitted in the room under various environments, by applying the room impulse filter to the re-synthesized second audio signal, and may obtain an audio signal that represents the acoustic feature of a transfer path through which the audio signal is not actually transferred. In other words, the electronic apparatus 1000 may obtain augmented audio signals that are not actually obtained, by applying a room impulse (RIR) filter to the second audio signal.

Figure 10:
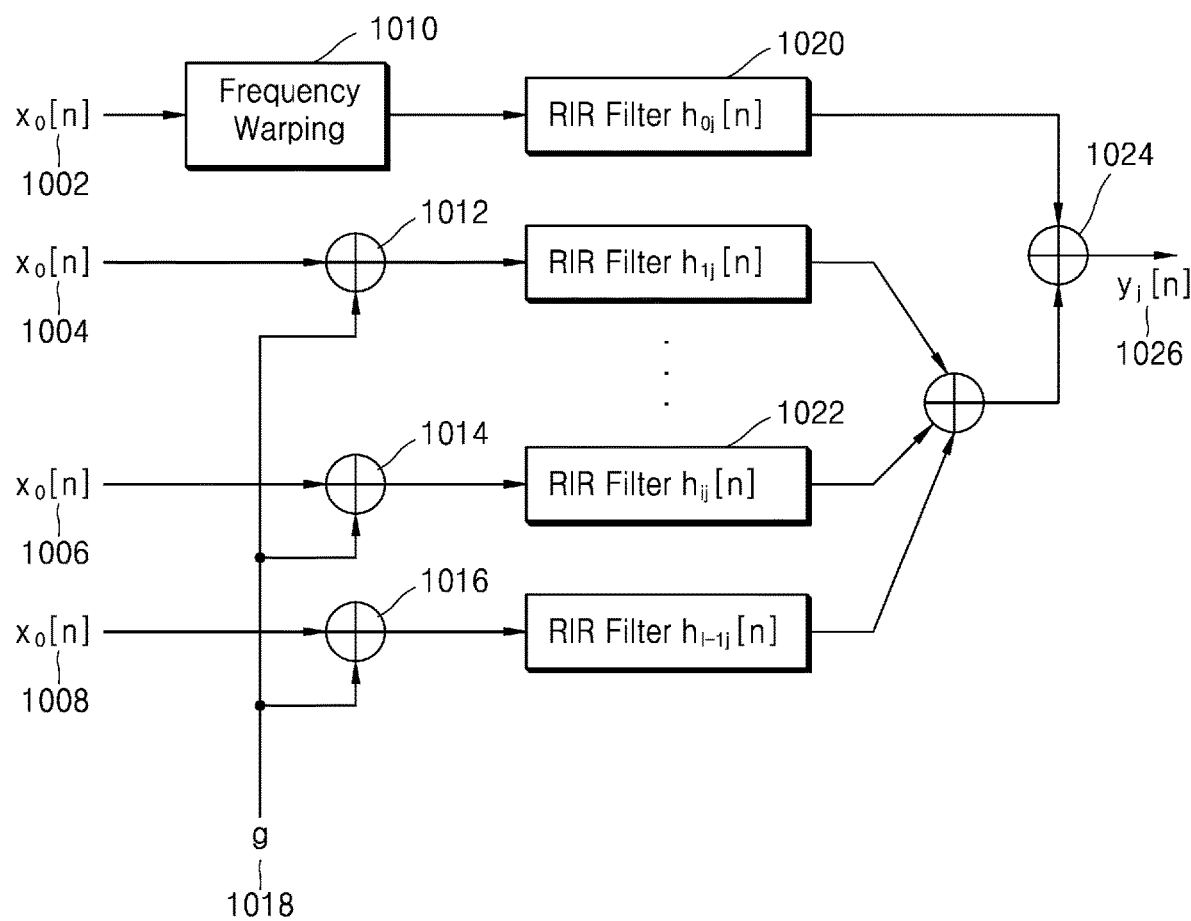
FIG. 10 is a schematic view of a process of processing, by the electronic apparatus, an audio signal for voice recognition model training, according to an embodiment.

FIG. 10 is a schematic view of a process of processing, by the electronic apparatus 1000, an audio signal for voice recognition model training, according to an embodiment.

The electronic apparatus 1000 may obtain an audio signal and augment the obtained audio signals by using a certain data augmentation technique. For example, the electronic apparatus 1000 may obtain a first audio signal 1002 including user voice from a user and noise signals 1004, 1006, and 1008 from $1^{st}$ to (I−1)th noise sources.

The electronic apparatus 1000 may obtain a frequency spectrum of the first audio signal 1002, and transforming frequency axis (frequency warping, 1010) of the frequency spectrum of the first audio signal 1002 by using a warping coefficient and a warping function defined based on the warping coefficient. The electronic apparatus 1000 may multiply the frequency spectrum of the first audio signal 1002 in which the frequency axis is transformed by a room impulse filter 1020 in a frequency domain. The room impulse filter 1020 is a room impulse response that indicates an acoustic feature of a transfer path through which an audio signal is transmitted from a 0-th sound source to a j-th microphone in the room.

Furthermore, the electronic apparatus 1000 may multiply the noise signals 1004, 1006, and 1008 obtained from the 1st to (I−1)th noise sources by a gain factor g to adjust a relative intensity between noise signals, and multiply each of the noise signals multiplied by the gain factor by a room impulse filter in a frequency domain. The electronic apparatus 1000 may obtain an augmented audio signal yj[n] by adding both of a result of the application of the room impulse filter and a result of the application of the room impulse filter 1020 to a first audio signal in which the frequency axis is transformed, to a result of the multiplication of the noise signals 1004, 1006, and 1008 by the gain factor g. The augmented audio signal yj[n] may be defined by Equation below.

$$y_j[n] = F(x_0[n]\,|\,\alpha) * h_{0j}[n] + g\sum_{i=1}^{I-1} x_i[n] * h_{ij}[n] \qquad \text{Equation 15}$$

$y_j[n]$ denotes an audio signal obtained from the j-th microphone, $x_0[n]$ denotes user voice signal to be recognized, $h_{0j}[n]$ denotes a room impulse response from the 0-th noise source to the j-th noise source, $x_i[n]$ denotes a noise signal obtained from the i-th noise source in a range that $1 \leq i \leq I-1$, and $h_{ij}[n]$ denotes a room impulse response indicating an acoustic feature of a path through which a noise signal $x_i[n]$ is transferred from the i-th noise source to the j-th microphone. Furthermore, $F(\cdot|\alpha)$ denotes a warping function (frequency warping), and $\alpha$ denotes a warping coefficient.

Generally, for a VTLP to model the vocal tract length variation of different speakers, the vocal tract length variation of different speakers is modeled by adjusting the scale of a filter bank in the frequency spectrum of an audio signal in a frequency domain, not a time domain, but it is difficult to apply an RIR filter by another data augmentation technology after the filter bank is applied during a VTLP signal processing process.

In the electronic apparatus 1000 according to the disclosure, before the first audio signal is obtained and a feature vector is extracted from the obtained first audio signal, first, to model the vocal tract length variation of different speakers, frequency axis of the frequency spectrum of the first audio signal is transformed, and the second audio signal is re-synthesized by using the frequency spectrum of the first audio signal in which the frequency axis is transformed, and thus the RIR may be simultaneously applied through VTLP and acoustic simulation.

Furthermore, in the augmentation of an audio signal by the electronic apparatus 1000 according to the disclosure, the order of re-synthesizing the audio signal by using a warping coefficient and a warping function to represent the vocal tract length variation of different speakers and applying an RIR filter to the re-synthesized audio signal may represent a transfer order of a series of audio signals, that is, voice signals of speakers having different vocal tract lengths are actually received by a microphone in the room. Accordingly, the electronic apparatus 1000 according to the disclosure may train a voice recognition model with improved accuracy of voice recognition by re-synthesizing an audio signal by using a warping coefficient and a warping function to represent the vocal tract length variation of different speakers, and then applying an RIR filter to the re-synthesized audio signal.

Figure 11:
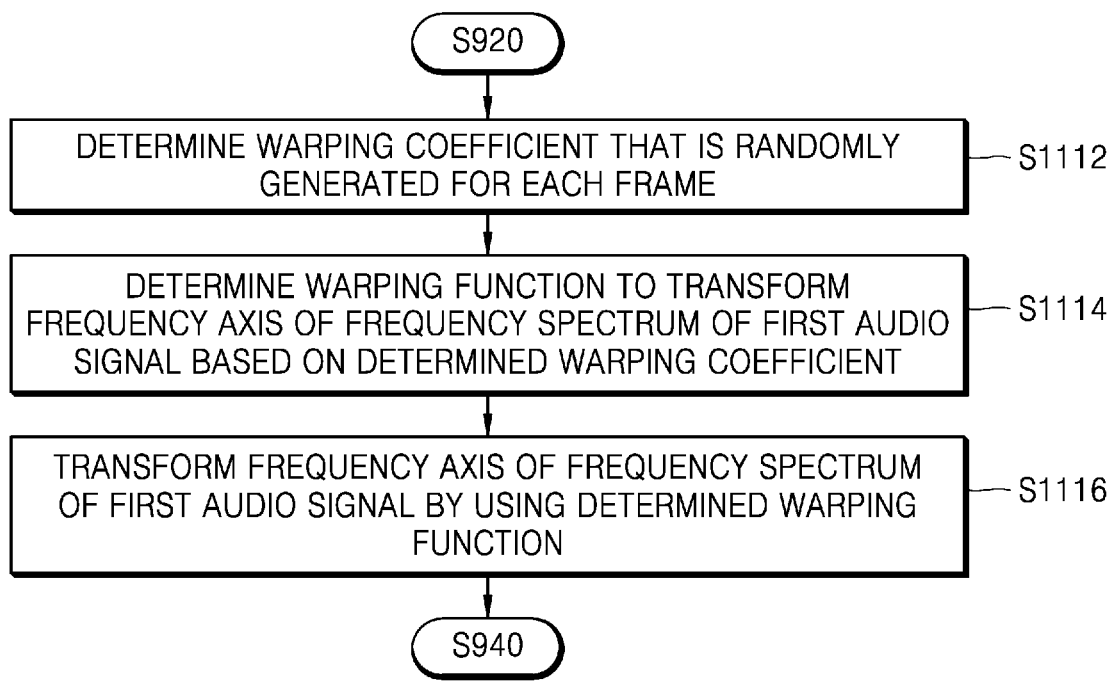
FIG. 11 is a flowchart of a method of transforming, by the electronic apparatus, frequency axis, according to an embodiment.

FIG. 11 is a flowchart of a method of performing, by the electronic apparatus 1000, transforming frequency axis, according to an embodiment.

A process of transforming frequency axis of the frequency spectrum of an audio signal to model the vocal tract length variation of different speakers by the electronic apparatus 1000 is described below in detail with reference to FIG. 11. In S1112, the electronic apparatus 1000 determines a warping coefficient. For example, the electronic apparatus 1000 may randomly determine a warping coefficient for each frame of a first audio signal.

In S1114, the electronic apparatus 1000 may determine a warping function to transform frequency axis of the frequency spectrum of the first audio signal based on the determined warping coefficient. The electronic apparatus 1000 may determine a warping function based on a piecewise linear rule or a bilinear rule to transform frequency axis of the frequency spectrum. First, a warping function according to the piecewise linear rule may be defined by the following Equation.

$$w'_k = \begin{cases} w\alpha, & w \leq w_{hi}\frac{\min(\alpha, 1)}{\alpha} \\ \pi - \frac{\pi - w_{hi}\min(\alpha, 1)}{\pi - w_{hi}\frac{\min(\alpha, 1)}{\alpha}}(\pi - w), & \text{otherwise} \end{cases} \quad \text{Equation 16}$$

$\alpha$ denotes a warping coefficient, and the warping function defines a relationship of an input frequency W and a frequency-warped W'$_k$ as an output frequency. For example, when the input frequency W satisfies that $$w \leq w_{hi}\frac{\min(\alpha, 1)}{\alpha},$$

the frequency-warped output frequency W'$_k$ is W$^\alpha$, and the frequency-warped output frequency W'$_k$ in other range may be expressed by $$\pi - \frac{\pi - w_{hi}\min(\alpha, 1)}{\pi - w_{hi}\frac{\min(\alpha, 1)}{\alpha}}(\pi - w).$$

The electronic apparatus 1000 may determine a warping function having the input frequency W as an input and the output frequency W'$_k$ as an output, according to a piecewise linear rule and based on Equation 16.

According to another embodiment, the electronic apparatus 1000 may determine a warping function based on a bilinear rule, and transform frequency axis of the frequency spectrum of the first audio signal according to the determined warping function.

$$w'_k = w_k + 2\tan^{-1}\left(\frac{(1-\alpha)\sin(w_k)}{1-(1-\alpha)\cos(w_k)}\right) \quad \text{Equation 17}$$

W$_k$ denotes an input frequency, and W'$_k$ denotes a frequency-warped output frequency. The electronic apparatus 1000 may determine a warping function having the frequency W$_k$ as an input and the output frequency W'$_k$ as an output, according to a bilinear rule and based on Equation 17. In S1116, the electronic apparatus 1000 may determine a warping function based on Equation 16 or 17, and transforming frequency axis of the frequency spectrum of the first audio signal by using the determined warping function.

Figure 12:
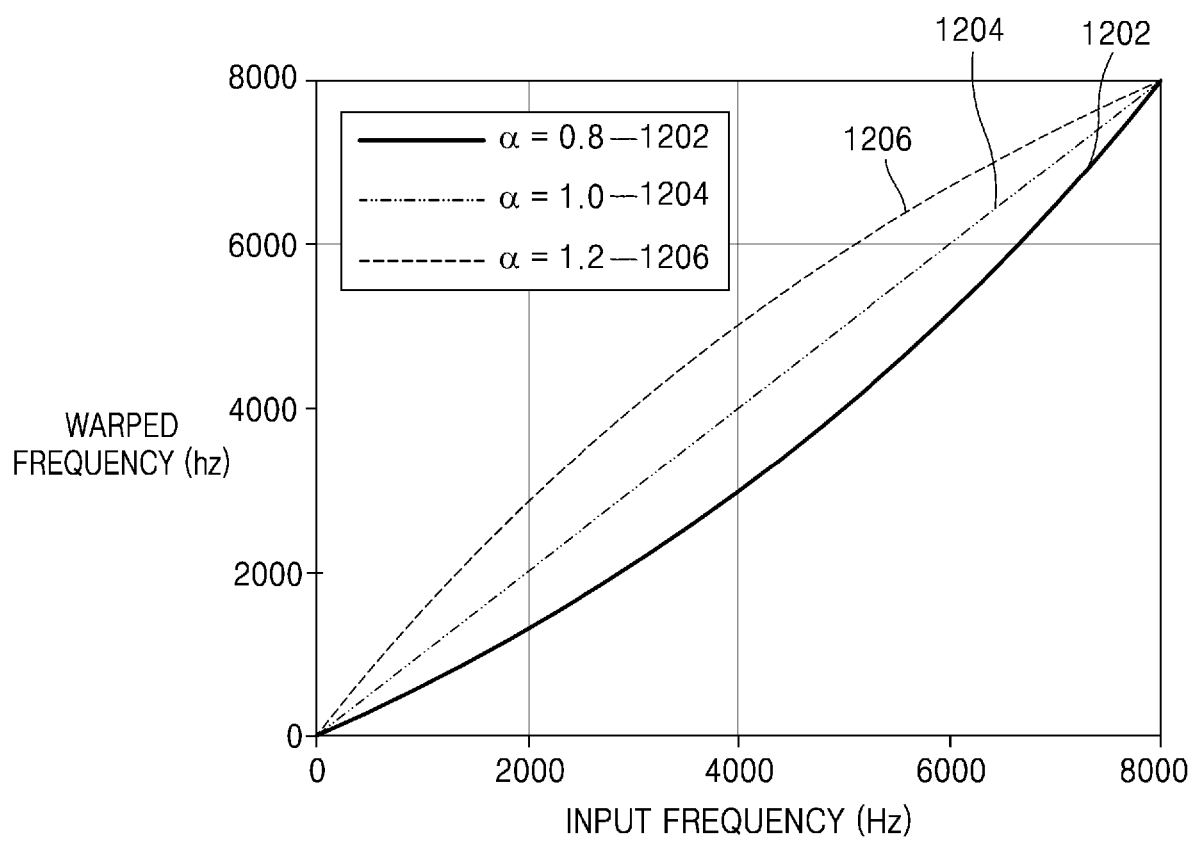
FIG. 12 is a view for describing a process of warping an input frequency according to a warping coefficient.

FIG. 12 is a view for describing a process of warping an input frequency according to a warping coefficient.

The electronic apparatus 1000 may determine a warping coefficient and transforming frequency axis of the frequency spectrum of the first audio signal by using a warping function defined based on the determined warping coefficient. For example, referring to FIG. 12, the electronic apparatus 1000 determines a warping coefficient to be between 0.8 and 1.2, and performs frequency warping on an input frequency by using a warping function according to a bilinear rule and based on the determined warping coefficient.

For example, when the electronic apparatus 1000 sets a warping coefficient to be 0.8, a distribution of an output frequency, for example, a warped frequency, output from the warping function according to a bilinear rule may indicate a frequency distribution in a downward convex shape with respect to the input frequency. According to another embodiment, when the electronic apparatus 1000 sets a warping coefficient to be 1, a distribution of an output frequency output from the warping function may indicate a linear distribution.

Furthermore, when the electronic apparatus 1000 sets a warping coefficient to be 1.2, the distribution of an output frequency output from the warping function may indicate a frequency distribution in an upward convex shape. In other words, the electronic apparatus 1000 may define a warping function according to a bilinear rule or a piecewise linear rule based on a warping coefficient to represent different vocal tract lengths of speakers, and transform frequency axis of the frequency spectrum of the first audio signal by using the defined warping function, thereby modeling the vocal tract length variation of speakers.

Figure 13:
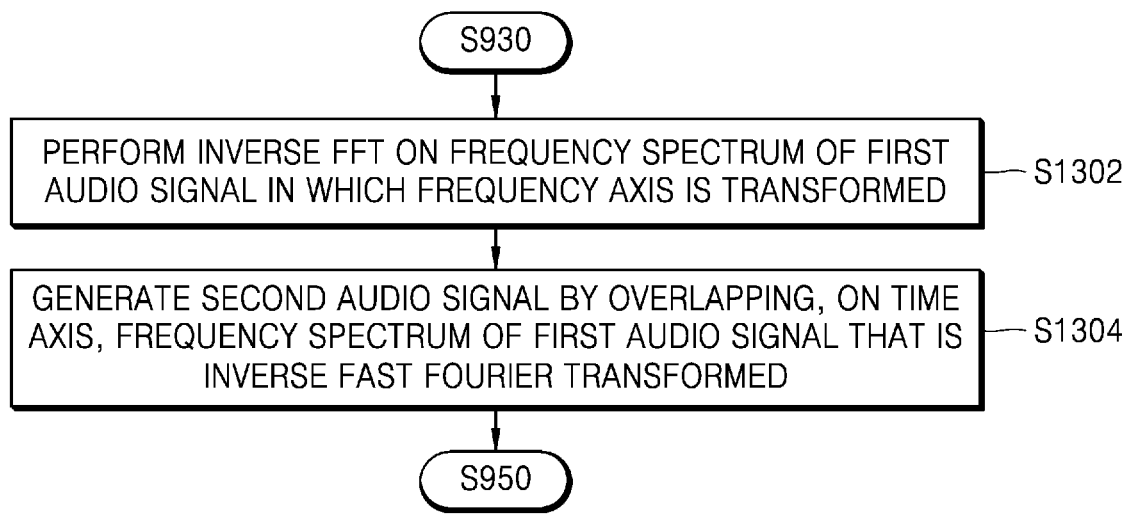
FIG. 13 is a view of a method of re-synthesizing, by the electronic apparatus, a second audio signal by using a first audio signal in which the frequency axis is transformed, according to an embodiment.

FIG. 13 is a view of a method of re-synthesizing, by the electronic apparatus 1000, a second audio signal by using a first audio signal in which the frequency axis is transformed, according to an embodiment.

In S1302, the electronic apparatus 1000 may perform inverse FFT (IFFT) on the frequency spectrum of the first audio signal in which the frequency axis is transformed (frequency warped). In S1304, the electronic apparatus 1000 may generate a second audio signal that is a re-synthesized first audio signal, by overlapping and adding, on a time axis, the frequency spectrum of the first audio signal that is inverse fast Fourier transformed.

For example, the electronic apparatus 1000 obtains an audio signal segmented into frame units by segmenting an audio signal by using a window having a certain window length, and transform the audio signal for each frame in a frequency domain. In other words, as the electronic apparatus 1000 transforms the audio signal for each frame in a frequency domain, when the frequency spectrum of an audio signal that is transformed in a frequency domain is inversely transformed in a time domain, a re-synthesized audio signal may be obtained by overlapping the frequency spectrum of an audio signal that is transformed in a time domain and adding audio signals of an overlapped time domain.

Figure 14:
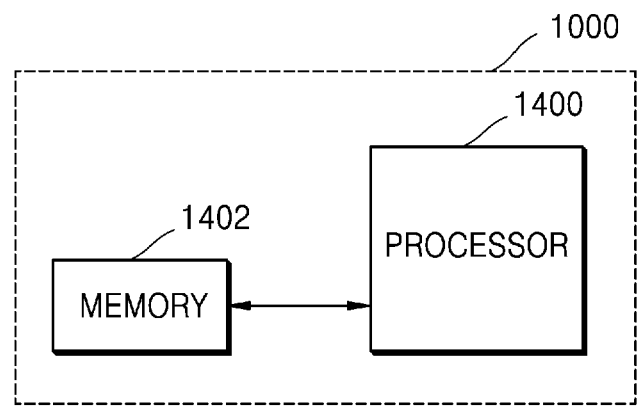
FIG. 14 is a block diagram of an electronic apparatus according to an embodiment.
Figure 15:
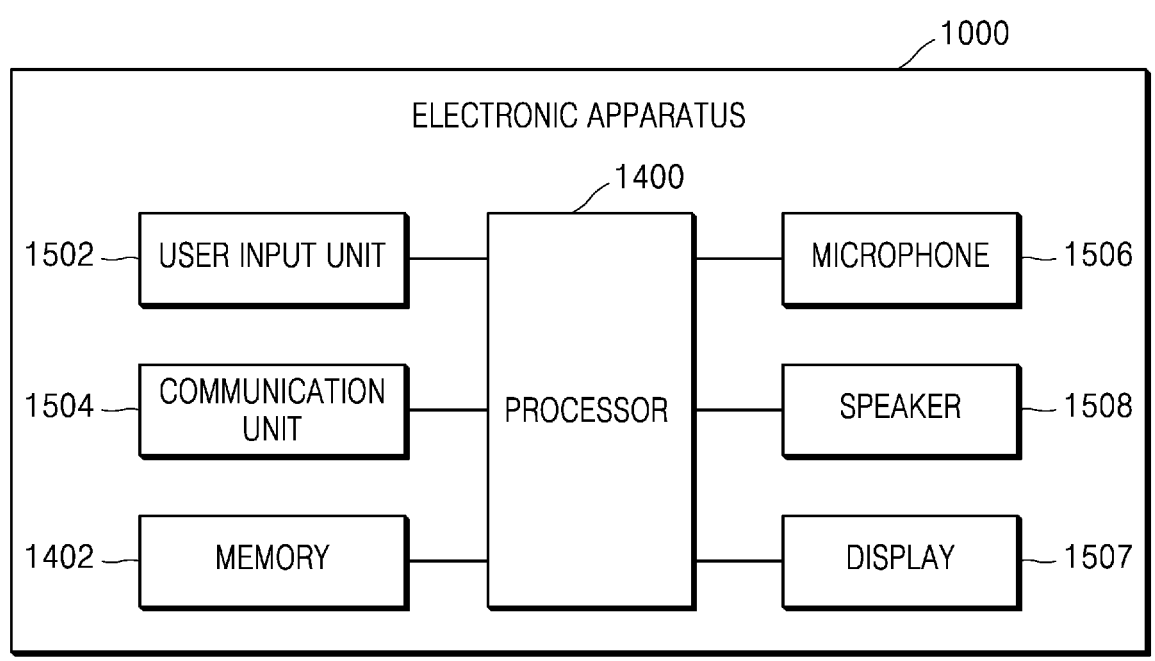
FIG. 15 is a block diagram of an electronic apparatus according to another embodiment.

FIG. 14 is a block diagram of an electronic apparatus according to an embodiment. FIG. 15 is a block diagram of an electronic apparatus according to another embodiment.

As illustrated in FIG. 14, the electronic apparatus 1000 according to an embodiment may include a processor 1400 and a memory 1402. However, all of the illustrated constituent elements are not essential constituent elements. The electronic apparatus 1000 may be implemented by more or less constituent elements than the illustrated constituent elements. For example, as illustrated in FIG. 15, the electronic apparatus 1000 according to an embodiment may further include a user input unit 1502, a communication unit 1504, a microphone 1506, a display 1507, and a speaker 1508.

The processor 1400 may control an overall operation of the electronic apparatus 1000 by executing one or more instructions in the memory 1402. For example, the processor 1400 may generally control the user input unit 1502, the communication unit 1504, the microphone 1506, the display 1507, the speaker 1508, and the like by executing one or more instructions stored in the memory 1402. Furthermore, the processor 1400 may perform the functions of the electronic apparatus 1000 of FIGS. 1 to 12 by executing one or more instructions stored in the memory 1402.

Furthermore, the processor 1400 may include one or a plurality of processors, and one or a plurality of processors may include a general purpose processor such as a CPU, an AP, a digital signal processor (DSP), and the like, a graphics dedicated processor such as a GPU or a vision processing unit (VPU), or an artificial intelligence (AI) dedicated processor such as an NPU. According to an embodiment, when the processor 1400 is implemented by a plurality of processors, a graphics dedicated processor, or an AI dedicated processor such as an NPU, at least some of a plurality of processors, a graphics dedicated processor, or an AI dedicated processor such as an NPU may be mounted on the electronic apparatus 1000 and other electronic apparatus or a plurality of servers connected to the electronic apparatus 1000.

For example, the processor 1400 may, by executing one or more instructions, obtain an audio signal segmented into a plurality of frame units, determine energy component for each filter bank by applying a filter bank distributed according to a preset scale to a frequency spectrum of the audio signal segmented into the frame units, smooth the determined energy component for each filter bank, extract a feature vector of the audio signal based on the smoothed energy component for each filter bank, and input the extracted feature vector to a voice recognition model, thereby recognizing user voice in the audio signal.

For example, the processor 1400 may, by executing one or more instructions, determine a window length of a window to segment the audio signal into a plurality of frame units, overlap the windows of a determined window length at a predetermined window interval, and segment the audio signal into a plurality of frame units by using the overlapped windows.

Furthermore, the processor 1400 may apply a distributed filter bank to the frequency spectrum of an audio signal, converting a value of the frequency spectrum to which the filter bank is applied to a log-scale, and determine an energy component for each filter bank by using the value of the frequency spectrum that is converted to the log-scale.

Furthermore, the processor 1400 may train, for each filter bank, a smoothing coefficient to smooth the energy component for each filter bank, based on the uniformly distributed target energy component, and smooth the energy component for each filter bank by using the smoothing coefficient trained for each filter bank.

Furthermore, the processor 1400 may generate a histogram related to the size of a frequency spectrum of an audio signal for each frequency component, determine a mapping function to map the generated histogram to a target histogram in which the size for each frequency component is uniformly distributed, transform the frequency spectrum of an audio signal by using the determined mapping function, and applying the filter bank distributed according to the preset scale to the frequency spectrum of the transformed audio signal, thereby smoothing the determined energy component for each filter bank.

According to another embodiment, the processor 1400 may process an audio signal to train a voice recognition model. For example, to train a voice recognition model, the processor 1400 may obtain a first audio signal segmented into a plurality of frame units, obtain a frequency spectrum of the first audio signal segmented into the frame units, to represent a variation of different vocal tract lengths of a plurality of speakers, transforming frequency axis of the frequency spectrum of the first audio signal, generate a second audio signal by using the frequency spectrum of the first audio signal in which the frequency axis is transformed, and extract a feature vector from the generated second audio signal.

According to another embodiment, the processor 1400 may train a voice recognition model to recognize user voice by using the feature vector extracted from the re-synthesized second audio signal.

According to an embodiment, the processor 1400 may apply a room impulse filter indicating the acoustic feature of the second audio signal for each transfer path in a room to the second audio signal, and extract a feature vector from the second audio signal to which the room impulse filter is applied.

Furthermore, the processor 1400 may determine a warping coefficient that is randomly generated for each frame, determine a warping function to transform frequency axis of the frequency spectrum of the first audio signal based on the determined warping coefficient, and transform frequency axis of the frequency spectrum of the first audio signal by using the determined warping function.

Furthermore, the processor 1400 may perform inverse FFT on the frequency spectrum of the first audio signal in which the frequency axis is transformed, and overlap, on a time axis, the frequency spectrum of the first audio signal that is inverse fast Fourier transformed, thereby generating the second audio signal.

Furthermore, the processor 1400 may determine an energy component for each filter bank by applying the filter bank distributed according to the preset scale to the frequency spectrum of the second audio signal segmented into a plurality of frame units, smooth the determined energy component for each filter bank, and extract a feature vector of the second audio signal based on the smoothed energy component for each filter bank.

According to an embodiment, in order to represent a variation of different vocal tract lengths of a plurality of speakers, the voice recognition model pre-trained by the processor 1400 may be pre-trained, based on the feature vector of the audio training signal re-synthesized by using the frequency spectrum of the audio training signal in which frequency axis of the frequency spectrum of the audio training signal obtained for each frame unit is transformed.

Furthermore, the voice recognition model may be pre-trained based on the re-synthesized audio training signal to which a room impulse filter indicating an acoustic feature of the audio signal for each transfer path in a room in which the audio signal is transmitted is applied. A structure of a voice recognition model used by the electronic apparatus 1000 according to the disclosure, and a training method thereof, are described below in detail with reference to FIGS. 17 and 18.

The memory 1402 may include one or more instructions to control the operation of the electronic apparatus 1000. Furthermore, the memory 1402 may include one or more voice recognition models to recognize user voice in the audio signal. Furthermore, programs stored in the memory 1402 may be classified into a UI module, a touch screen module, an alarm module, and the like according to functions thereof.

According to an embodiment, the memory 1402 may include at least one type storage medium of. For example, a flash memory type, a hard disk type, a multimedia card micro type, a card type memory, for example, SD or XD memory and the like, random access memory (RAM) static RAM (SRAM), read-only memory (ROM), electrically erasable programmable ROM (EEPROM), programmable ROM (PROM), magnetic memory, a magnetic disc, an optical disc, and the like, but the disclosure is not limited thereto.

The user input unit 1502 may receive a user input to control the operation of the electronic apparatus 1000. For example, the user input unit 1502 may include a key pad, a dome switch, a touch pad such as a contact capacitance method, a pressure resistance film method, an infrared detection method, a surface ultrasound conduction method, an integral tension measurement method, a piezo effect method, and the like, a jog wheel, a jog switch, and the like, but the disclosure is not limited thereto.

The communication unit 1504 may include one or more communication modules for communication with the server 2000. For example, the communication unit 1504 may include at least one of a short-range wireless communication unit or a mobile communication unit.

The short-range wireless communication unit may include a Bluetooth communication unit, a Bluetooth low energy (BLE) communication unit, a near field communication unit, a WLAN (Wi-Fi) communication unit, a Zigbee communication unit, an infrared data association (IrDA) communication unit, a Wi-Fi direct (WFD) communication unit, an ultra wideband (UWB) communication unit, an Ant+ communication unit, and the like, but the disclosure is not limited thereto.

The mobile communication unit may transmit/receive wireless signals with at least one of a base station, an external terminal, and a server in a mobile communication network. The wireless signals may include various types of data according to a voice call signal, a video call signal, or text/multimedia message transmission/reception.

The microphone 1506 may receive an audio signal including user voice. Furthermore, the microphone 1506 may receive an audio signal including a noise signal generated from a plurality of noise sources, other than the user voice. The microphone 1506 may transmit an obtained audio signal to the processor 1400 so that voice recognition by a voice recognition model is performed.

The speaker 1508 may output a result of the recognition of the user voice in the audio signal as an audio signal. For example, the speaker 1508 may output, as sound, a signal related to a function, for example, call signal receiving sound, message receiving sound, and alarm sound, performed in the electronic apparatus 1000.

The display 1507 may output and display information processed in the electronic apparatus 1000. For example, the display 1507 may display, in the form of text, a result of the recognition of the user voice in the audio signal. The display 1507 may display an interface for the control of the electronic apparatus 1000, an interface for display a state of the electronic apparatus 1000, and the like.

Figure 16:
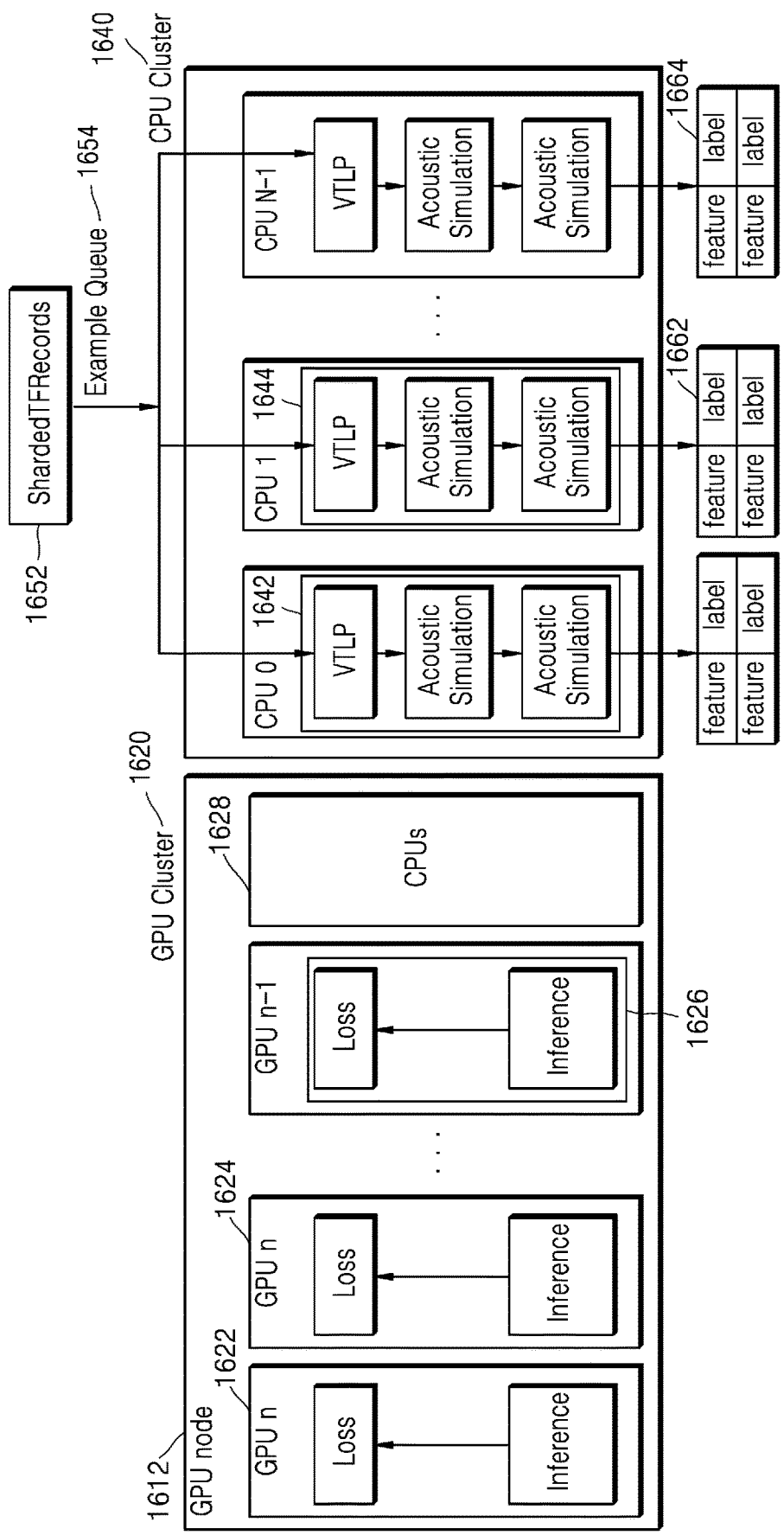
FIG. 16 is a view of the structure of the electronic apparatus for training a voice recognition model, according to an embodiment.

FIG. 16 is a view of the structure of the electronic apparatus for training a voice recognition model, according to an embodiment.

According to an embodiment, the electronic apparatus 1000 may train a voice recognition model by using a central processing unit (CPU) cluster 1640 including a plurality of CPUs 1642 and 1644 and a graphics processing unit (GPU) cluster 1620 including a plurality of GPUs 1622, 1624, and 1626. Generally, a large amount of computing resource is consumed for a CPU to apply VTLP and acoustic simulation to an audio signal and extract a feature from an audio signal re-synthesized through the VTLP and acoustic simulation, the electronic apparatus 1000 may effectively perform the VTLP and acoustic simulation by using a cluster including a plurality of CPUs, and extract a feature vector from the audio signal re-synthesized through the VTLP and acoustic simulation.

Furthermore, the electronic apparatus 1000 may transmit feature vectors output from the CPUs and text information corresponding to the feature vector to a GPU node 1612 including a plurality of GPUs and a plurality of CPUs for controlling the GPUs, so that each GPU cluster train the voice recognition model in parallel. In the following description, a process of training a voice recognition model by using a plurality of CPUs and GPUs is described below in detail.

First, the electronic apparatus 1000 may receive a plurality of audio signals by using the CPU cluster 1640. The audio signals received by the electronic apparatus 1000 may be audio signals in a time domain that is randomly divided. For example, ShardedTFRecords 1652 received by the electronic apparatus 1000 may include audio signals that are randomly selected, not in a temporal order. Furthermore, the ShardedTFRecords 1652 may include audio signals that are received from a plurality of speakers and segmented (Sharded) into certain frame units. For example, the ShardedTFRecords 1652 may include an audio signal such as "Hello" received from a speaker A and audio signals such as "Hi, Bixby" received from a speaker B.

The electronic apparatus 1000 may randomly split the audio signal such as "Hello" received from the speaker A and the audio signals such as "Hi, Bixby" received from the speaker B, and temporarily store the split audio signals in an example queue 1654. The electronic apparatus 1000 may transmit the split audio signals stored in the example queue 1654 to a plurality of CPUs in the CPU cluster 1640. The electronic apparatus 1000 may transmit the split audio signals stored in the example queue 1654 sequentially to the CPUs, or the split audio signals stacked in QueueQuere may be transmitted to the CPUs in a random order.

Each of the CPUs in the CPU cluster 1640 may receive audio signals, transform frequency axis of the frequency spectrum of a received audio signal by using a warping function, and perform inverse transforming on the frequency spectrum comprising the transformed frequency axis, thereby obtaining a re-synthesized audio signal (VTLP). Furthermore, each of the CPUs in the CPU cluster 1640 may apply an acoustic simulation by applying a room impulse filter indicating an acoustic feature of the audio signal for each transfer path in a room, for example, a transfer function indicating an acoustic feature for each transfer path as a room impulse response, to the re-synthesized audio signal.

Furthermore, each of the CPUs in the CPU cluster 1640 may determine an energy component for each filter bank by applying the filter bank distributed according to the preset scale to the frequency spectrum of the obtained audio signals through the acoustic simulation, and extract a feature vector from the frequency spectrum in which the determined energy component for each filter bank is smoothed (power-function based MUD). Each of the CPUs in the CPU cluster 1640 may obtain text information corresponding to the feature vector from labels 1662 and 1664 including text information corresponding to the extracted feature vector, and transmit the obtained text information and the extracted feature vector together to a CPUs 1628 in the GPU node 1612.

The CPUs 1628 in the GPU node 1612 may transmit the feature vector received from the CPU cluster 1640 and the text information corresponding to the feature vector to a plurality of GPUs, and a voice recognition model may be trained by each of the GPUs. According to an embodiment, the CPUs 1628 in the GPU node 1612 may determine priority information to transmit the feature vector received from the CPU cluster 1640 and the text information corresponding to the feature vector to the GPUs, and transmit the feature vector and the text information corresponding to the feature vector to the GPUs based on the determined priority information.

The GPUs in the GPU node 1612 may train the voice recognition model based on the received feature vector and text information. For example, the GPUs 1622, 1624, and 1626 may determine an inference output with respect to the voice recognition model based on the feature vector and the text information, and determine loss by comparing an output value of the inference output with a correct value, thereby training the voice recognition model. A process of determining inference based on the feature vector and the text information may corresponding to a decoding process in the voice recognition model described below with reference to FIGS. 17 and 18. A method of training, by the electronic apparatus 1000, a voice recognition model is described below in detail with reference to FIGS. 17 and 18.

According to an embodiment, the CPUs 1628 in the GPU node 1612 may determine a current state of a plurality of GPUs in the GPU node 1612, and transmit information about the state of the GPUs, as a feedback information, to the CPU cluster 1640. The CPU cluster 1640 may adjust a transmission speed of the feature vector and the text information output by the CPUs 1628 by using the feedback information received from the GPU cluster 1620.

In other words, the electronic apparatus 1000 according to the disclosure may include the GPUs that are relatively faster than the CPUs, and determine a device ratio between the CPUs and the GPUs, thereby effectively training effectively the voice recognition model. The electronic apparatus 1000 may extract a feature vector from an audio signal on which the VTLP and acoustic simulation are not performed, and determine a device ration between the CPUs and the GPUs based on a speed value of training the voice recognition model by using the extracted feature vector.

Figure 17:
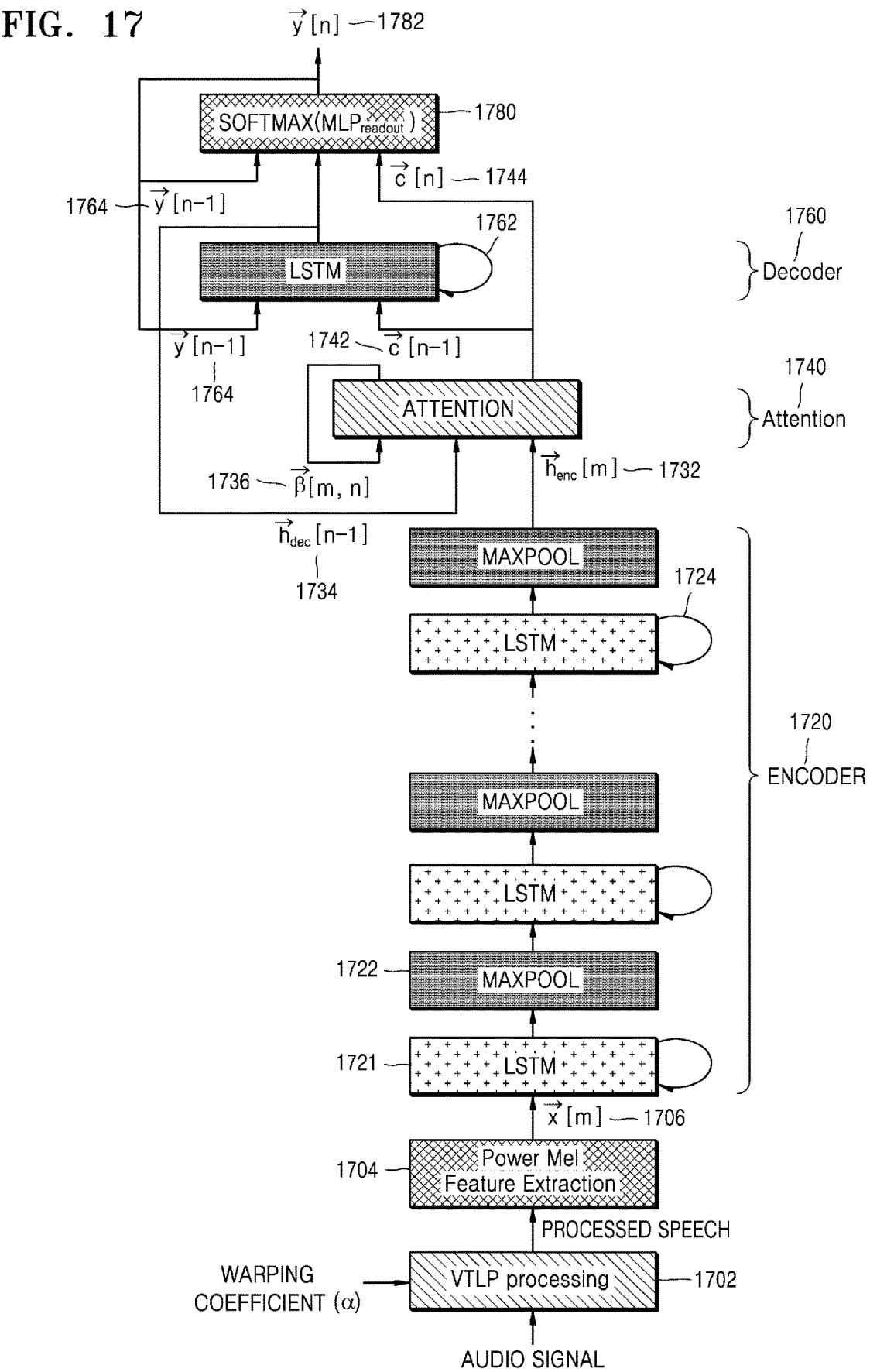
FIG. 17 is a view of a process in which the electronic apparatus trains a voice recognition model, according to an embodiment.

FIG. 17 is a view of a process in which the electronic apparatus trains a voice recognition model, according to an embodiment.

According to an embodiment, the electronic apparatus 1000 may pre-train a voice recognition model to recognize user voice in an audio signal. The voice recognition model used by the electronic apparatus 1000 is an auto speech recognition (ASR) model, and may be an End-to-End type attention-based neural network model. However, the voice recognition model used by the electronic apparatus 1000 is not limited to an end-to-end type attention-based neural network model, and may include all other neural network-based models needed to train the voice recognition model. The voice recognition model used by the electronic apparatus 1000, which is an attention-based neural network model, may include an encoder including a plurality of long short-term memory (LSTM) layers for encoding a feature vector of an audio signal and a max-pooling layer, a decoder including an LSTM layer to output a text by decoding the encoded feature vector, an attention layer to set attention to feature vectors output from the encoder based on a correlation between the encoder and the decoder, and a soft max layer to output a probability that the feature vector weighted based on the attention indicates a label about a specific keyword. However, as described above, the voice recognition model used by the electronic apparatus 1000 is not limited to the structure of the voice recognition model of FIG. 17, and may include all other neural network-based models for voice recognition.

For example, the electronic apparatus 1000 may obtain an audio signal segmented into a plurality of frame units and a warping coefficient. Although the electronic apparatus 1000 may obtain a warping coefficient from a user or an external device connected to the electronic apparatus 1000, the electronic apparatus 1000 by itself may generate a warping coefficient for each frame of an audio signal. The electronic apparatus 1000 may determine a warping function by using the warping coefficient generated for each frame, transform frequency axis of the frequency spectrum of an audio signal by using the determined warping function, and overlap and add the frequency-warped frequency spectrum again in a time domain, thereby generating a re-synthesized audio signal.

In other words, the electronic apparatus 1000 may perform VTLP processing (1702) for representing the vocal tract lengths of a plurality of speakers with respect to the frequency spectrum of an audio signal. According to another embodiment, the electronic apparatus 1000 may secure various pieces of data for training a voice recognition model by further performing acoustic simulation on the re-synthesized audio signal through VTLP processing.

The electronic apparatus 1000 may extract a feature vector from the re-synthesized audio signal through VTLP. For example, the electronic apparatus 1000 may determine an energy component for each filter bank by applying the filter bank distributed according to a mel-scale to the re-synthesized frequency spectrum of an audio signal, and smooth the energy component for each filter bank by applying a power-function having a smoothing coefficient $\frac{1}{15}$ as an exponent of a power to the determined energy component for each filter bank. Furthermore, the electronic apparatus 1000 may extract a feature vector a feature vector based on the smoothed energy component for each filter bank by using the power-function having a smoothing coefficient $\frac{1}{15}$ as an exponent of a power (1704).

The feature vector extracted by the electronic apparatus 1000 includes a frequency feature in an m dimension and may be formed in units of frames. In other words, one frame 1706 may be expressed by a feature vector including frequency features in the m dimension. The electronic apparatus 1000 may sequentially input feature vectors extracted in units of frames to the voice recognition model.

An encoder 1720 of the voice recognition model may include a plurality of LSTM layers and max-pooling layers. The encoder 1720 may transform a dimension of a frame by applying non-linearity to a plurality of frames sequentially input, and output only some of input frames by selecting a frame of the frames having the transformed dimension at a predetermined ratio.

For example, a case in which the encoder 1720 includes four pairs of an LSTM layer 1721 and a max-pooling layer 1722 is assumed. The LSTM layer 1721 and the max-pooling layer 1722 may form a single layer in the encoder 1720, and accordingly, the encoder 1720 may include a total of four single layers. For example, when eight frames having an m dimension are sequentially input to the encoder 1720, each frame may be transformed to a dimension different form the m dimension by applying non-linearity through the LSTM layer 1721 thereto, and the max-pooling layer 1722 receiving dimension transformed frames may select a frame having a greater audio feature between the audio features of two frames.

Accordingly, the encoder 1720 including a total of four layers may receive eight frames in the m dimension, and output one frame having a dimension different from the m dimension among the received eight frames in the m dimension. A dimension 1732 of a frame output from the encoder 1720 that receives an input of eight frames in the m dimension may be in a hidden dimension state because the dimension 1732 is unknown due to a non-linearity feature of the LSTM layer 1721. According to another embodiment, when an audio signal segmented into 1000 frames in 40 dimensions is input to the encoder 1720, as eight times pooling is obtained through four max-pooling layers, the encoder 1720 may output 1000/8 frames in unknown dimensions.

An attention layer 1740 may set attention to feature vectors output from the encoder 1720 based on the correlation between the encoder 1720 and a decoder 1760. For example, the attention layer 1740 may set attention between the feature vectors output from the encoder 1720 by using the feature vector 1732 in the hidden dimension state output from the encoder 1720, and a feature vector 1734 in the hidden dimension state output from the decoder 1760 of a previous time and an attention weight feedback determined in the attention layer 1740.

For example, the attention layer 1740 may determine an attention weight feedback based on the feature vector of the previous time output from the encoder 1720 and the feature vector 1734 of the previous time output from the decoder 1760. The attention layer 1740 may apply attention to the feature vectors output from the encoder 1720 by using the attention weight feedback, and determine a context feature vector 1744 by weighted summing the features vectors to which the attention is applied. In other words, the context feature vector 1744 output by the attention layer 1740 may be a weighted sum of the frames output from the encoder 1720 to which the attention weight is applied. Alternatively, the context feature vector 1744 may be some frames selected from the frames output from the encoder 1720 based on the attention weight determined by the attention layer 1740.

The decoder 1760 may decode the weight-summed feature vectors output from the attention layer 1740. For example, the decoder 1760 may include one LSTM layer. The decoder 1760 may transform the dimension of the context feature vector 1742 of the previous time by applying non-linearity to the context feature vector 1742 of the previous time, based on the context feature vector 1744 of a current time, the weight-summed feature vector output from the attention layer 1740, and a recurrent state 1762 of LSTM in the decoder 1760. As the dimension of the feature vector output from the decoder 1760 is unknown due to the non-linearity feature of LSTM, the dimension may be in the hidden dimension state.

A soft max layer 1780 may determine a probability value that the feature vector in the hidden dimension state output from the decoder 1760 corresponds to a certain text label. For example, the soft max layer 1780 may receive inputs of the feature vector in the hidden dimension state output from the decoder 1760 at the previous time, the context feature vector 1744 of the current time output from the attention layer 1740, and the text information output from the soft max layer 1780 at the previous time, and determine a probability value that the feature vector output from the decoder 1760 corresponds to a certain text label such as "Hi, Bixby" or "Hello".

According to an embodiment, the soft max layer 1780 may determine the probability value that the feature vector in the hidden dimension state output from the decoder 1760 corresponds to a certain text label, without receiving the inputs of the context feature vector 1744 of the current time output from the attention layer 1740 and the text information output from the soft max layer 1780 at the previous time. The soft max layer 1780 may output text information 1782 of a text label corresponding to the highest probability value of the probability values of the text label. The voice recognition model having the above-described structure may be pre-trained by modifying and refining the attention regarding a connection strength between the encoder 1720, the decoder 1760, the attention layer 1740, and the soft max layer 1780, based on the feature vector extracted from the re-synthesized audio signal through the VTLP processing.

Figure 18:
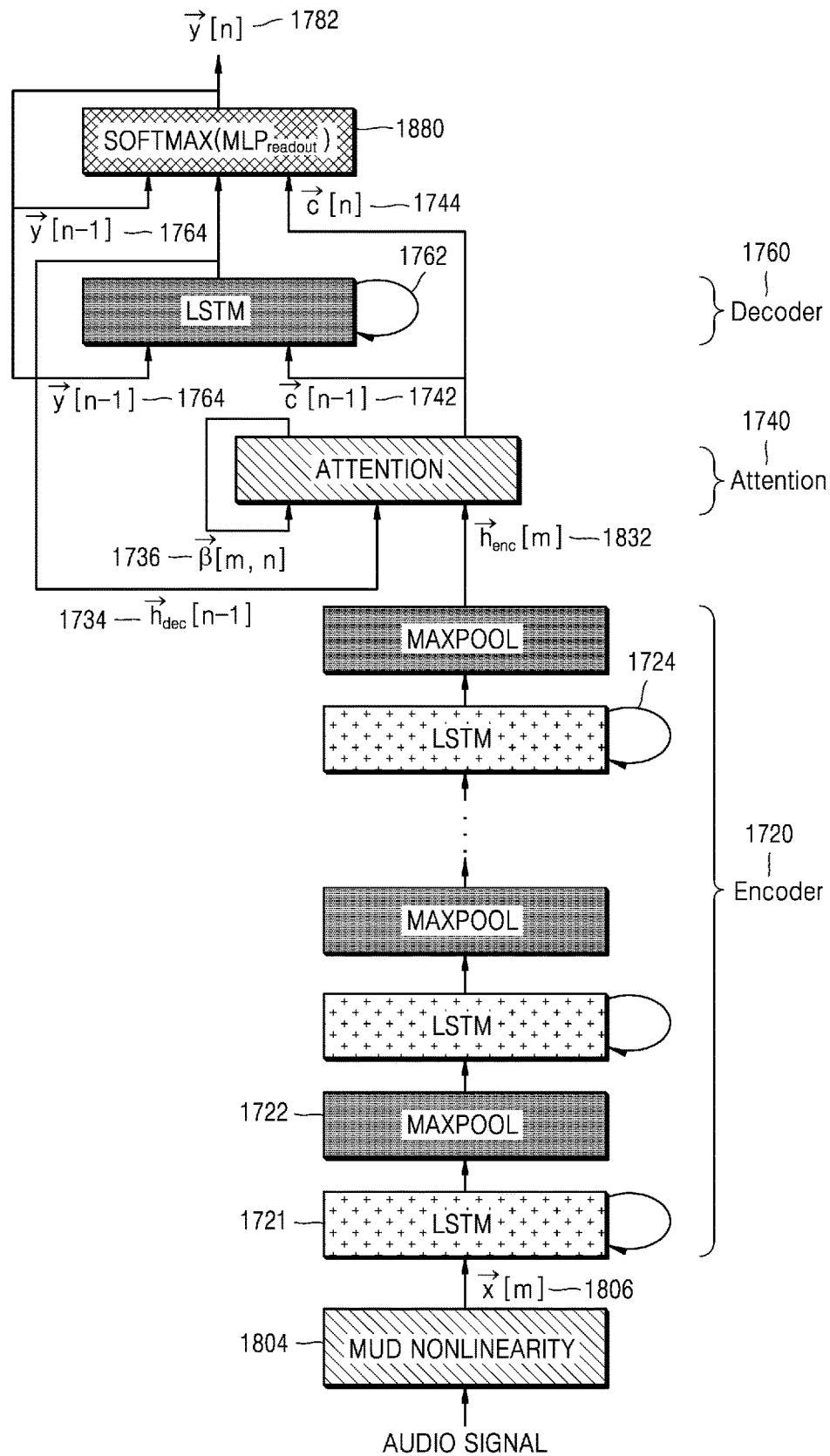
FIG. 18 is a view of a process in which the electronic apparatus performs voice recognition by inputting a feature vector with a smoothed energy component for each filter bank to a voice recognition model, according to an embodiment.

FIG. 18 is a view of a process in which the electronic apparatus 1000 performs voice recognition by inputting a feature vector with a smoothed energy component for each filter bank to a voice recognition model, according to an embodiment.

The electronic apparatus 1000 may accurately recognize user voice by smoothing the frequency spectrum of an energy component for each filter bank of an audio signal and inputting a feature vector extracted from the frequency spectrum having a smoothed energy component for each filter bank to a pre-trained voice recognition model.

For example, to apply power-non linearity 1804 to the frequency spectrum of an energy component for each filter bank of an audio signal, the electronic apparatus 1000 may determine a smoothing coefficient for each filter bank and smooth the energy component for each filter bank by using a power-function having the smoothing coefficient as an exponent of a power. According to another embodiment, the electronic apparatus 1000 may smooth the energy component for each filter bank of an audio signal by using a mapping function determined based on the histogram related to the size or frequency of the frequency spectrum of an audio signal for each frequency component. A process in which the electronic apparatus 1000 applies the power-non linearity 1804 to the energy component for each filter bank of the frequency spectrum may correspond to the process of FIGS. 4 to 7.

The electronic apparatus 1000 may extract a feature vector 1806 from the frequency spectrum having a smoothed energy component for each filter bank, and input the extracted feature vector 1806 to a pre-trained voice recognition model. As the structure and operating method of the voice recognition model pre-trained by the electronic apparatus 1000 may correspond to the structure and operating method of the above-described voice recognition model of FIG. 17, detailed descriptions thereof are omitted.

Figure 19:
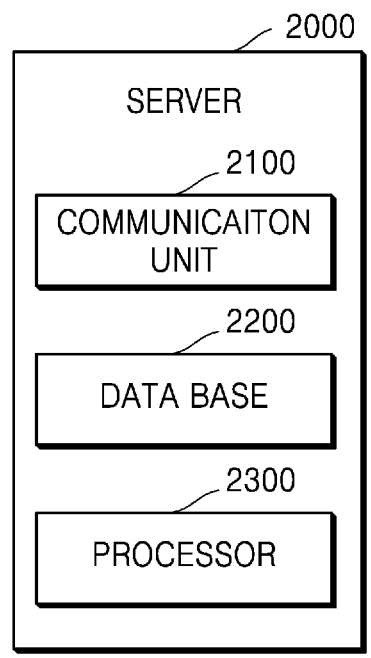
FIG. 19 is a block diagram of a server according to an embodiment.

FIG. 19 is a block diagram of a server 2000 according to an embodiment.

According to an embodiment, the server 2000 may include a communication unit 2100, a data base (DB) 2200, and a processor 2300.

The communication unit 2100 may correspond to the communication unit 1504 of the electronic apparatus 1000 of FIG. 15. For example, the communication unit 2100 may receive an audio signal from the electronic apparatus 1000 or transmit information about a result of voice recognition with respect to the audio signal received from the electronic apparatus 1000 to the electronic apparatus 1000. Furthermore, the communication unit 2100 may transmit/receive the audio signal received from the electronic apparatus 1000 or the information about a result of voice recognition with respect to the shared audio signal, with respect to other server by communicating with a communication unit in another server.

The DB 2200 may correspond to the memory 1402 of FIG. 15. For example, the DB 2200 may sore a voice recognition model. Furthermore, the DB 2200 may provide a voice recognition service using the voice recognition model and may further store a data augmentation algorithm and a feature extraction algorithm which are needed to train the voice recognition model.

The processor 2300 may typically control an overall operation of the server 2000. For example, the processor 2300 may generally control the DB 2200, the communication unit 2100, and the like, by executing programs stored in the DB 2200 of the server 2000. Furthermore, the processor 2300 may perform part of the operation of the electronic apparatus 1000 of FIGS. 1 to 18 by executing the programs stored in the DB 2200.

For example, to represent a variation of different vocal tract lengths of a plurality of speakers, the processor 2300 may obtain an audio signal from the electronic apparatus 1000, transforming frequency axis of the frequency spectrum of the audio signal, and generate a re-synthesized audio signal by using the frequency spectrum of the audio signal in which the frequency axis is transformed. Furthermore, the processor 2300 may represent different acoustic features of the audio signal for each transfer path in the room by applying the RIR to re-synthesized audio signal.

Furthermore, to improve the voice recognition accuracy of a voice recognition model, the processor 2300 may smooth the re-synthesized energy component for each filter bank of the audio signal, and extract a feature vector from the frequency spectrum including the smoothed energy component for each filter bank. For example, the processor 2300 may pre-train a smoothing coefficient for each filter bank, and smooth energy for each filter bank of the audio signal by using a trained power-function having the smoothing coefficient as an exponent of a power. According to another embodiment, the processor 2300 may smooth the energy component for each filter bank of an audio signal by using a histogram related to the size or frequency of the frequency spectrum of an audio signal for each frequency component and a mapping function of the histogram.

Figure 20:
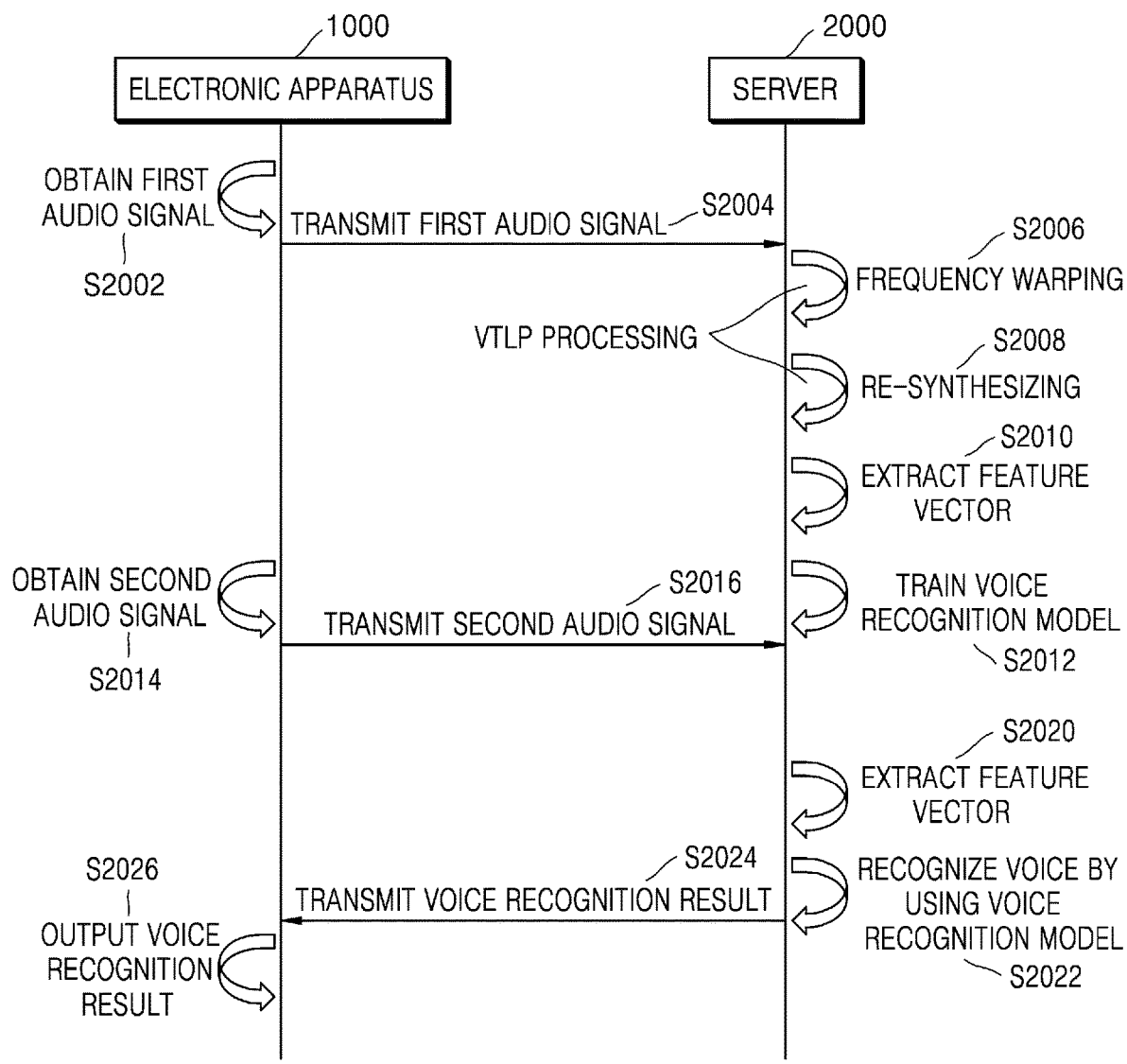
FIG. 20 is a view of a method of recognizing user voice when the electronic apparatus and the server are in association with each other, according to an embodiment.

FIG. 20 is a view of a method of recognizing user voice when the electronic apparatus and the server are in association with each other, according to an embodiment.

In S2002, the electronic apparatus 1000 may obtain a first audio signal. In S2004, the electronic apparatus 1000 may transmit the obtained first audio signal to the server 2000. According to an embodiment, the electronic apparatus 1000 may segment the first audio signal into a plurality of frame units by using a window having a preset window length, and transmit the first audio signal segmented into the frame units to the server 2000.

In S2006, the server 2000 may transform frequency axis (perform frequency warping) of the frequency spectrum of the received first audio signal. For example, the server 2000 may receive a predetermined warping coefficient from the electronic apparatus 1000, and determine a warping function according to Equation 15 or 16 based on the warping coefficient. The server 2000 may represent a variation of the vocal tract lengths of a plurality of speakers by transforming frequency axis of the frequency spectrum of the first audio signal by using the warping coefficient and the warping function.

In S2008, the server 2000 may re-synthesize the first audio signal by using the frequency spectrum of the first audio signal in which the frequency axis is transformed. For example, the server 2000 may generate a re-synthesized audio signal (VTLP) by performing inverse FFT on the frequency spectrum of the first audio signal in which the frequency axis is transformed and overlapping and adding, on a time axis, the frequency spectrum of the first audio signal that is inverse fast Fourier transformed. According to an embodiment, the server 2000 may further generate audio signals indicating different acoustic features of the audio signal for each transfer path in the room by applying an RIR filter to the re-synthesized audio signal.

In S2010, the server 2000 may extract a feature vector from the re-synthesized audio signal. According to an embodiment, the server 2000 may extract a feature vector from the re-synthesized audio signal to which the RIR filter is applied. Furthermore, according to an embodiment, in S2010, the server 2000 may smooth the energy component for each filter bank of the re-synthesized audio signal, and extract a feature vector based on the smoothed energy component for each filter bank. As a method of extracting, by the server 2000, a re-synthesized feature vector may correspond to the process of extracting, by the electronic apparatus 1000, a feature vector from the re-synthesized audio signal of FIGS. 2 to 7, a detailed description thereof is omitted.

In S2012, the server 2000 may train a voice recognition model by using the extracted feature vector. According to an embodiment, when the server 2000 smooths the energy component for each filter bank of the re-synthesized audio signal and extracts a feature vector based on the smoothed energy component for each filter bank, the server 2000 may extract a feature vector from the audio signal with the smoothed energy component for each filter bank, and train a voice recognition model by using the extracted feature vector.

When the server 2000 smooths the energy component for each filter bank and trains the voice recognition model 3000 by using the feature vector extracted based on the smoothed energy component for each filter bank, in the recognition of user voice in a newly obtained audio signal, the server 2000 may smooth an energy component for each mel filter bank of the newly obtained audio signal 122, and input the feature vector 132 extracted based on the smoothed energy component for each filter bank to the voice recognition model, thereby recognizing user voice. A process of training, by the server 2000, a voice recognition model by using the extracted feature vector may correspond to the process of training, by the electronic apparatus 1000, the voice recognition model in FIGS. 17 and 18.

In S2014, the electronic apparatus 1000 may obtain a second audio signal from a user. In S2016, the electronic apparatus 1000 may transmit the obtained second audio signal to the server 2000. In S2020, the server 2000 may extract a feature vector the frequency spectrum of the second audio signal with the smoothed energy component for each filter bank. An operation of extracting, by the server 2000, a feature vector may correspond to the operation of extracting, by the electronic apparatus 1000, a feature vector in S240 of FIG. 2.

Furthermore, according to an embodiment, when the server 2000 smooths the energy component for each filter bank of the first audio signal and uses a voice recognition model trained by using the feature vector extracted based on the smoothed energy component for each filter bank, in S2020, the server 2000 may smooth the energy component for each filter bank of the frequency spectrum of the second audio signal and extract a feature vector from the second audio signal including the smoothed energy component for each filter bank. An operation of smoothing, by the server 2000, an energy component for each filter bank of the frequency spectrum of the second audio signal may correspond to the process of smoothing, by the electronic apparatus 1000, an energy component for each filter bank of an audio signal in FIGS. 4 to 7.

In S2022, the server 2000 may recognize user voice in the second audio signal by inputting the extracted feature vector to a pre-trained voice recognition model. In S2024, the server 2000 may transmit a voice recognition result output by the voice recognition model to the electronic apparatus 1000. In S2026, the electronic apparatus 1000 may output the voice recognition result received from the server 2000.

Figure 21:
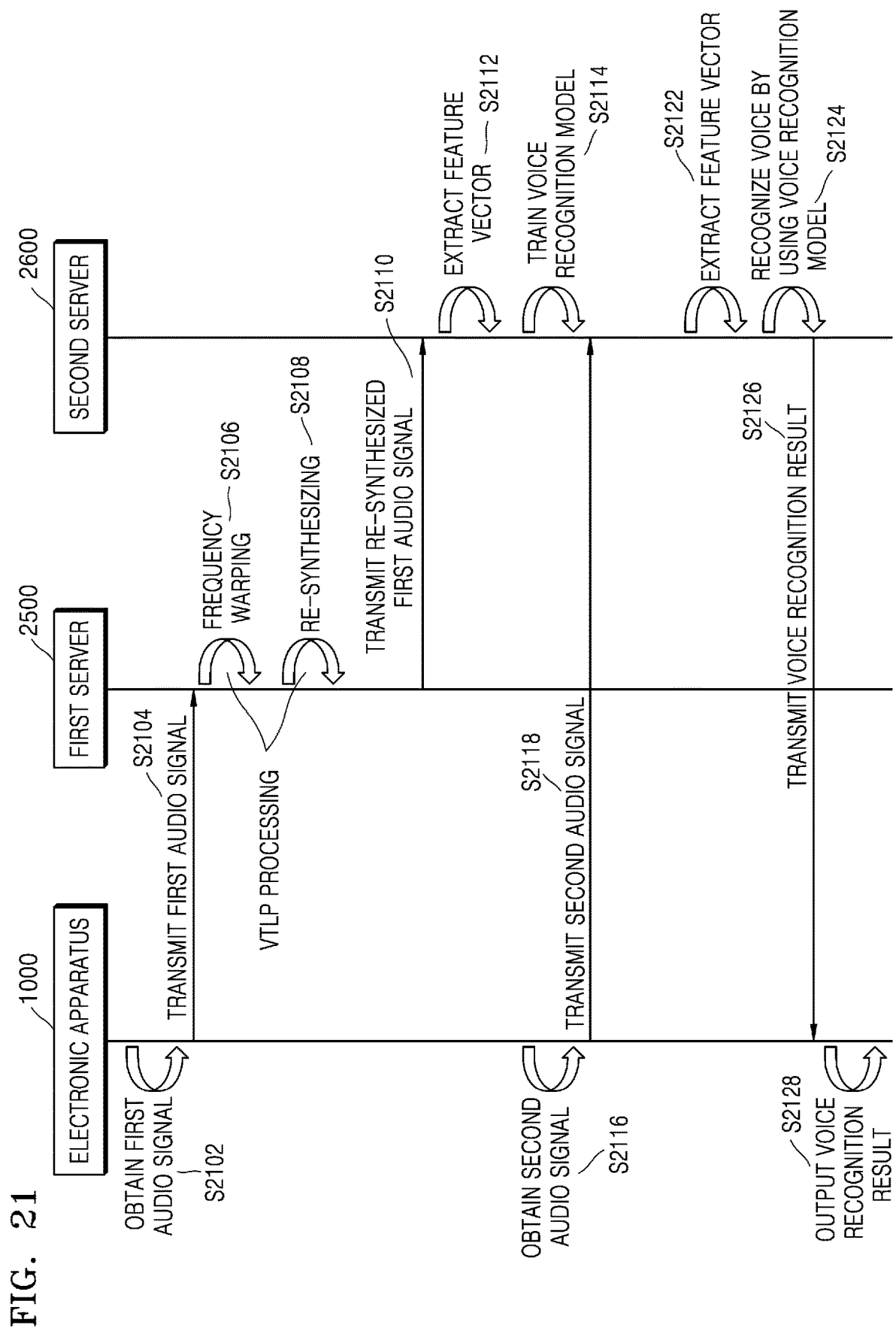
FIG. 21 is a view of a method of recognizing user voice when the electronic apparatus and the server are in association with each other, according to an embodiment.

FIG. 21 is a view of a method of recognizing user voice when the electronic apparatus and the server are in association with each other, according to an embodiment.

According to an embodiment of the disclosure, a method of recognizing user voice and a method of processing an audio signal to train a voice recognition model may be performed by an electronic apparatus and a plurality of servers in association with the electronic apparatus.

In S2102, the electronic apparatus 1000 may obtain a first audio signal. In S2104, the electronic apparatus 1000 may transmit the first audio signal to a first server 2500. According to another embodiment, the electronic apparatus 1000 may transmit the first audio signal to a second server 2600 so that the first audio signal may be transmitted to the first server 2500 via the second server 2600.

In S2106, the first server 2500 may transform frequency axis (perform frequency warping) of the frequency spectrum of the first audio signal by using a predetermined warping coefficient and a warping function according to Equation 15 or 16. In S2108, the first server 2500 may re-synthesize an audio signal by using the frequency spectrum of the audio signal in which the frequency axis is transformed, thereby performing a VTLP processing on the first audio signal. In S2110, the first server 2500 may transit the re-synthesized first audio signal to the second server 2600. In other words, according to an embodiment, the first server 2500 of FIG. 21 may be a dedicated server to augment the audio data on a network.

In S2112, the second server 2600 may extract a feature vector from the re-synthesized first audio signal received from the first server 2500. According to an embodiment, the second server 2600 may smooth the re-synthesized energy component for each filter bank of the first audio signal and extract a feature vector based on the smoothed energy component for each filter bank. An operation of extracting, by the second server 2600, a feature vector from the re-synthesized first audio signal may correspond to the operation of extracting, by the first server of FIG. 20, a feature vector from the re-synthesized audio signal in S2010.

In S2114, the second server 2600 may train a voice recognition model by using the feature vector. According to an embodiment, when the second server 2600 smooths the re-synthesized energy component for each filter bank of the first audio signal and extracts a feature vector based on the smoothed energy component for each filter bank, the second server 2600 may train the voice recognition model by using the feature vector extracted from the first audio signal with the smoothed energy component for each filter bank. An operation of training, by the second server 2600, a voice recognition model by using the feature vector may correspond to the operation of training, by the server 2000 of FIG. 2, a voice recognition model in S2012.

In S2116, the electronic apparatus 1000 may obtain a second audio signal. In S2118, the electronic apparatus 1000 may transmit the second audio signal to the second server 2600. According to an embodiment, the electronic apparatus 1000 may transmit the second audio signal to the second server 2600 via the first server 2500. In S2120, the second server 2600 may smooth the energy component for each filter bank of the second audio signal. S2120 is a process of smoothing the energy component for each filter bank of an audio signal, in which the electronic apparatus 1000 of FIGS. 4 to 7 may determine based on whether a log likelihood of the energy component for each filter bank of an audio signal is maximized, and which may correspond to the process of smoothing the energy component for each filter bank by using a power-function having a determined smoothing coefficient as an exponent of a power.

In S2122, the second server 2600 may extract a feature vector from the second audio signal with the smoothed energy component for each filter bank. According to an embodiment, when the second server 2600 smooths the energy component for each filter bank of the first audio signal and uses a voice recognition model trained by using the feature vector extracted based on the smoothed energy component for each filter bank, the second server 2600 may recognize user voice in the second audio signal by smoothing the energy component for each mel filter bank of the newly obtained second audio signal and inputting the feature vector extracted based on the smoothed energy component for each filter bank to the voice recognition model. In S2124, the second server 2600 may recognize user voice in the second audio signal by inputting the extracted feature vector to the voice recognition model. In S2126, the second server 2600 may transmit a voice recognition result output by the voice recognition model to the electronic apparatus 1000. In S2128, the electronic apparatus 1000 may output the voice recognition result received from the second server 2600.

As described above, the method of recognizing user voice may be performed by using a plurality of servers including the first server 2500 that augments an obtained audio signal and the second server 2600 that receives an augmented audio signal from the first server 2500, trains a voice recognition model based on the augmented audio signal, and recognizes user voice in the second audio signal by using the trained voice recognition model.

Figure 22:
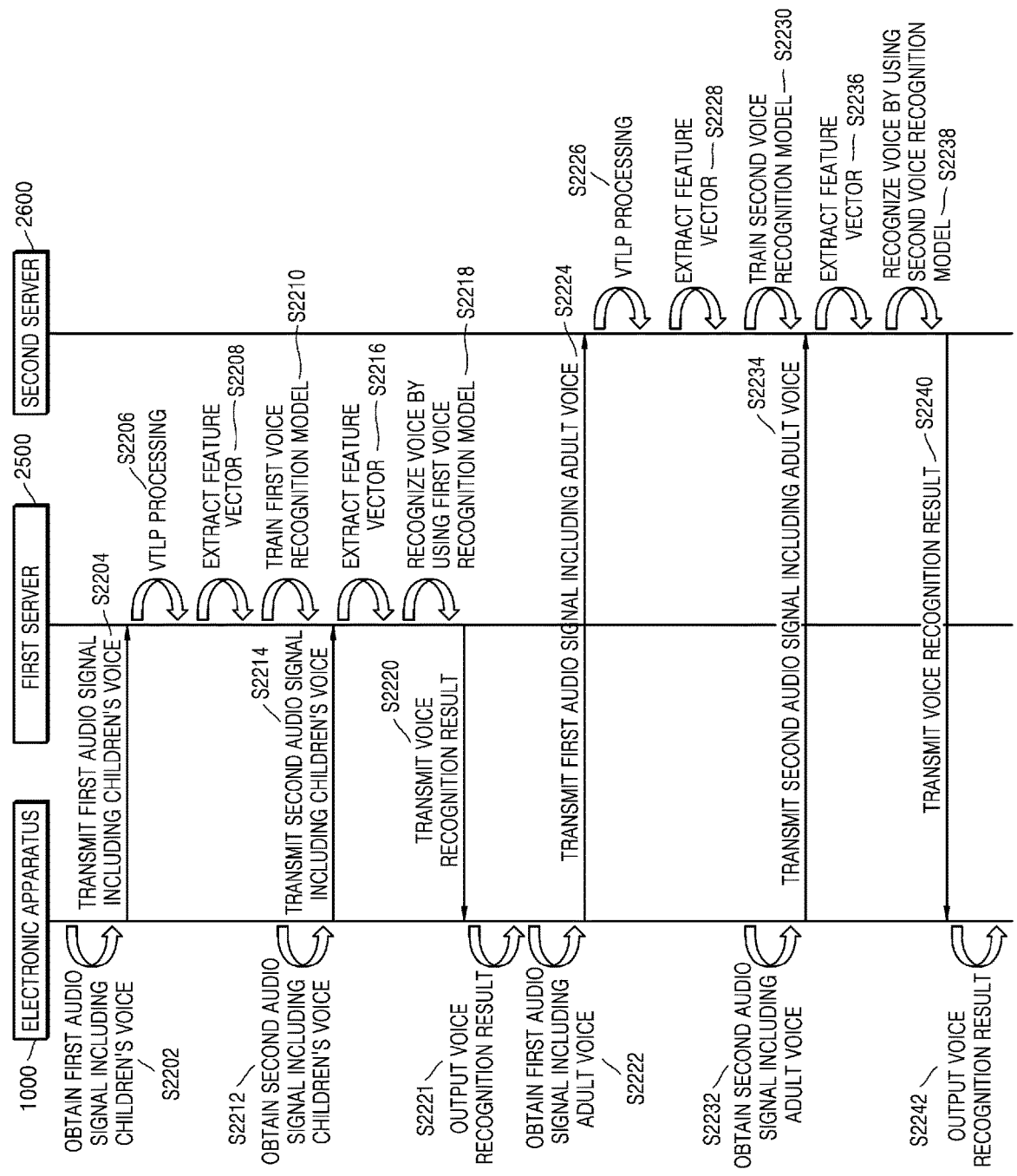
FIG. 22 is a view of a method of recognizing user voice when the electronic apparatus and the server are in association with each other, according to an embodiment.

FIG. 22 is a view of a method of recognizing user voice when the electronic apparatus and the server are in association with each other, according to an embodiment.

According to an embodiment of the disclosure, the electronic apparatus 1000 may accurately recognize voices of a plurality of speakers in association with a plurality of servers.

For example, in S2202, the electronic apparatus 1000 may obtain a first audio signal including children's voice. In S2204, the electronic apparatus 1000 may transmit the first audio signal including children's voice to the first server 2500. In S2206, the first server 2500 may perform VTLP processing on the first audio signal including children's voice. An operation of performing, by the first server 2500, VTLP processing on the first audio signal including children's voice may correspond to the operation of transforming, by the electronic apparatus 1000, frequency axis of the frequency spectrum of an audio signal by using warping coefficient and a warping function including the warping coefficient, in FIGS. 11 and 12.

According to an embodiment, the first server 2500 may further apply an RIR filter to a re-synthesized first audio signal through VTLP processing. In S2208, the first server 2500 may extract a feature vector from the re-synthesized audio signal through VTLP processing. According to an embodiment, the first server 2500 may smooth the energy component for each filter bank of the re-synthesized audio signal through VTLP processing, and extract a feature vector based on the smoothed energy component for each filter bank.

In S2210, the first server 2500 may train a first voice recognition model by using the extracted feature vector. According to an embodiment, the first server 2500 may extract a feature vector from the re-synthesized audio signal through VTLP processing to which the RIR filter is applied, and train the first voice recognition model by using the extracted feature vector. According to another embodiment, when the first server 2500 smooths the energy component for each filter bank of the re-synthesized audio signal and extract a feature vector based on the smoothed energy component for each filter bank, the first server 2500 may train a voice recognition model by using the feature vector extracted from the re-synthesized audio signal having the smoothed energy component for each filter bank.

In S2212, the first server 2500 may obtain a second audio signal including children's voice. In S2214, the first server 2500 may transmit the second audio signal including children's voice to the first server 2500. In S2216, in order to allow energy components for each filter bank of the frequency spectrum of the second audio signal to be distributed according to a maximum uniformity, the first server 2500 may smooth the energy component for each filter bank of the second audio signal by using a power-function having a smoothing coefficient pre-trained for each filter bank as an exponent of a power.

In S2218, the first server 2500 may recognize children's voice in the second audio signal including children's voice by inputting the extracted feature vector to the first voice recognition model. According to an embodiment, when the first server 2500 smooths the energy component for each filter bank of the first audio signal including children's voice and uses a voice recognition model trained by using the feature vector extracted based on the smoothed energy component for each filter bank, the first server 2500 may recognize the children's voice in the second audio signal by smoothing the energy component for each mel filter bank of the second audio signal including newly obtained children's voice and inputting the feature vector extracted based on the smoothed energy component for each filter bank to the voice recognition model. In S2220, the first server 2500 may transmit a voice recognition result output from the voice recognition model to the electronic apparatus 1000. In S2221, the electronic apparatus 1000 may output the voice recognition result received from the first server 2500.

In S2222, the electronic apparatus 1000 may obtain the first audio signal including adult voice. In S2224, the electronic apparatus 1000 may transmit the first audio signal including adult voice to the second server 2600. According to an embodiment, the electronic apparatus 1000 may transmit the first audio signal including adult voice to the second server 2600 through the first server 2500. In S2226, the second server 2600 may perform VTLP processing on the first audio signal including adult voice. An operation of performing, by the second server 2600, VTLP processing on the first audio signal including adult voice may correspond to the operation of transforming, by the electronic apparatus 1000, frequency axis of the frequency spectrum of an audio signal by using a warping coefficient and a warping function including the warping coefficient, in FIGS. 11 and 12.

According to an embodiment, the second server 2600 may further apply the RIR filter to the first audio signal including adult voice re-synthesized through VTLP processing. In S2228, the second server 2600 may extract a feature vector from the first audio signal including adult voice re-synthesized through VTLP processing. According to an embodiment, the second server 2600 may extract a feature vector from the re-synthesized first audio signal including adult voice to which the RIR filter is applied. Furthermore, although not illustrated in FIG. 22, in S2228, the second server 2600 may smooth the energy component for each filter bank of the second audio signal including adult voice re-synthesized through VTLP processing, and extract a feature vector based on the smoothed energy component for each filter bank. In other words, in order to allow the energy components for each filter bank of the frequency spectrum of the second audio signal including voice to be distributed according to the maximum uniformity, the second server 2600 may smooth the energy component for each filter bank of the second audio signal by using a power-function having a smoothing coefficient pre-trained for each filter bank as an exponent of a power.

In S2230, the second server 2600 may train a second voice recognition model by using the extracted feature vector. According to an embodiment, the second server 2600 may extract a feature vector from the second audio signal including adult voice having the smoothed energy component for each filter bank, and train the second voice recognition model by using the extracted feature vector.

In S2232, the electronic apparatus 1000 may obtain the second audio signal including adult voice. In S2234, the electronic apparatus 1000 may transmit the second audio signal including adult voice to the second server 2600. In S2236, the second server 2600 may extract a feature vector from the second audio signal including adult voice. According to an embodiment, in order to allow the energy components for each filter bank of the frequency spectrum of the second audio signal to be distributed according to the maximum uniformity, the second server 2600 may smooth the energy component for each filter bank of the second audio signal including adult voice and extract a feature vector from the second audio signal including adult voice having the smoothed energy component for each filter bank, by using a power-function having a smoothing coefficient pre-trained for each filter bank as an exponent of a power.

In S2238, the second server 2600 may recognize adult voice in the second audio signal including adult voice by inputting the feature vector to the second voice recognition model. According to an embodiment, when the second server 2600 smooths the energy component for each filter bank of the second audio signal including adult voice and uses a voice recognition model trained by using the feature vector extracted based on the smoothed energy component for each filter bank, the second server 2600 may recognize adult voice in the second audio signal by smoothing the energy component for each mel filter bank of the newly obtained second audio signal including adult voice and inputting the feature vector extracted based on the smoothed energy component for each filter bank to the voice recognition model.

In S2240, the second server 2600 may transmit a voice recognition result output from the second voice recognition model to the electronic apparatus 1000. In S2242, the electronic apparatus 1000 may output the voice recognition result received from the second server 2600. In other words, the electronic apparatus 1000 according to the disclosure may accurately recognize voice of a plurality of speakers in association with a plurality of servers, each of the servers including a voice recognition model to recognize voice of different speakers.

Figure 23:
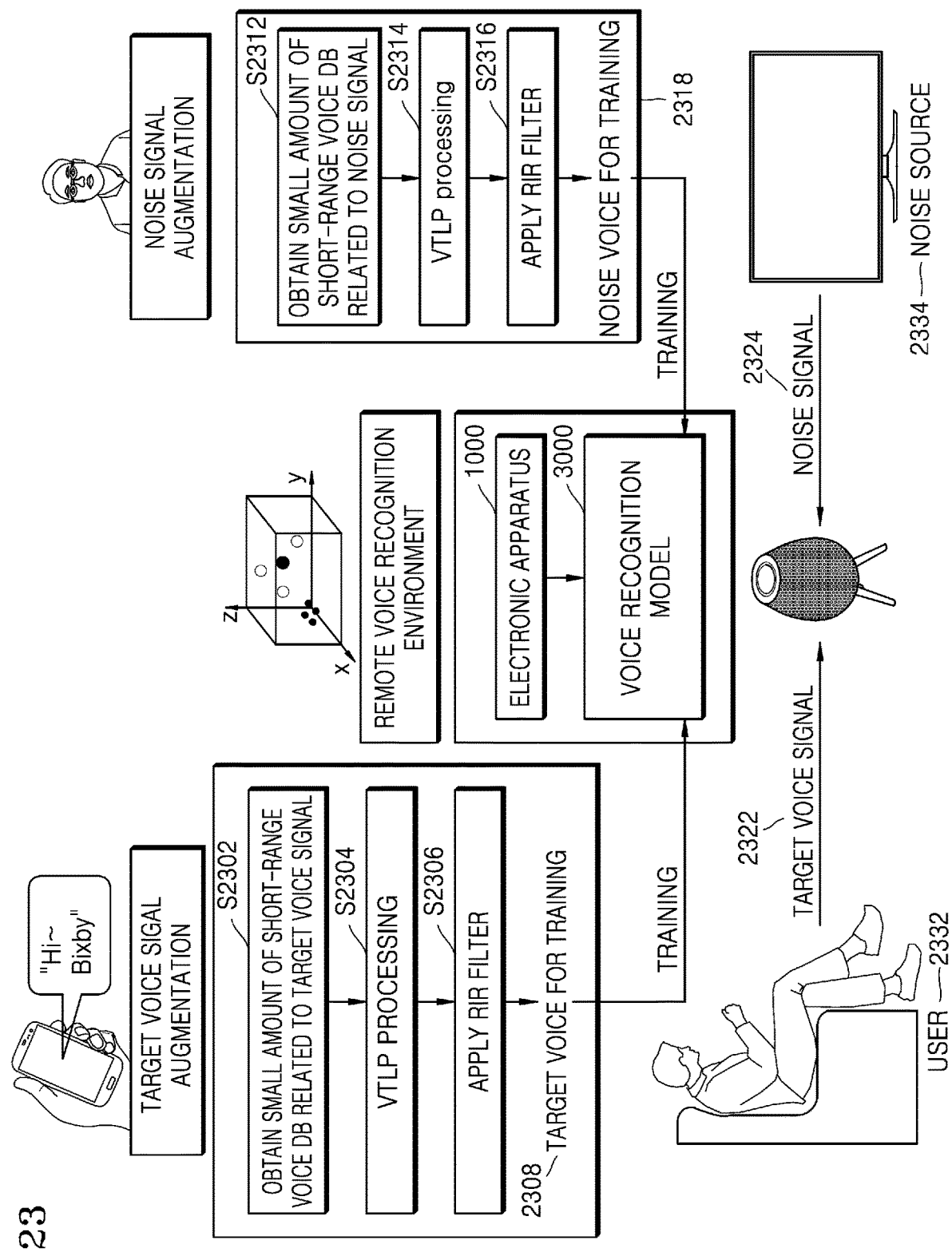
FIG. 23 is a view of a process of training, by the electronic apparatus, a voice recognition model by using both a target voice signal and a noise signal, according to an embodiment.

FIG. 23 is a view of a process of training, by the electronic apparatus 1000, a voice recognition model by using both of a target voice signal and a noise signal, according to an embodiment.

According to an embodiment, the electronic apparatus 1000 may train a voice recognition model so that the voice recognition model recognizes a target voice signal and a noise signal by distinguishing the target voice signal from the noise signal. In S2302, the electronic apparatus 1000 may obtain a small amount of short-range voice data base (DB) about the target voice signal. The short-range voice data base (DB) may include a small amount of voice signals related to the target voice signal expressed by various voice features such as a pronunciation duration, a speech frequency, a pitch, a tone, and the like.

In S2304, the electronic apparatus 1000 may perform VTLP processing on a small amount of target voice signals in the small amount of short-range voice data base. An operation of performing, by the electronic apparatus 1000, VTLP processing on voice signals related to the target voice signal in the small amount of short-range voice data base may correspond to the operation of transforming, by the electronic apparatus 1000, frequency axis of the frequency spectrum of an audio signal by using a warping coefficient and a warping function including the warping coefficient, in FIGS. 11 and 12.

In S2306, the electronic apparatus 1000 may further apply an RIR filter to the voice signals related to the target voice signal re-synthesized through VTLP processing. In other words, the electronic apparatus 1000 may model target voice signals transmitted in a virtual room by applying the acoustic feature of the audio signal for each transfer path in the virtual room including a remote environment to the voice signals related to the target voice signal re-synthesized through VTLP processing. The electronic apparatus 1000 may obtain a target voice 2308 for training by further applying an RIR filter to the voice signals related to the target voice signal re-synthesized through VTLP processing.

The electronic apparatus 1000 may train the voice recognition model 3000 of the electronic apparatus 1000 by using the obtained target voice 2308 for training. Although it is not illustrated in FIG. 23, the electronic apparatus 1000 may smooth an energy component for each filter bank of a signal of the target voice 2308 for training, and train the voice recognition model 3000 by using the feature vector extracted based on the smoothed energy component for each filter bank.

In S2314, the electronic apparatus 1000 may perform VTLP processing on noise signals in the small amount of short-range voice data base. An operation of performing, by the electronic apparatus 1000, VTLP processing on the noise signal in the small amount of short-range voice data base may correspond to the operation of transforming, by the electronic apparatus 1000, frequency axis of the frequency spectrum of an audio signal by using a warping coefficient and a warping function including the warping coefficient, in FIGS. 11 and 12.

In S2316, the electronic apparatus 1000 may further apply an RIR filter to voice signals related to the noise signal re-synthesized through VTLP processing. In other words, the electronic apparatus 1000 may model noise signals transmitted in a virtual room by applying an acoustic feature for each transfer path of the noise signal in the virtual room including a remote environment to the voice signals related to the noise signal re-synthesized through VTLP processing. The electronic apparatus 1000 may obtain the noise voice 2318 for training by further applying an RIR filter to the voice signals related to the noise signal re-synthesized through VTLP processing.

The electronic apparatus 1000 may train the voice recognition model 3000 of the electronic apparatus 1000 by using the obtained noise voice 2318 for training. Although it is not illustrated in FIG. 23, the electronic apparatus 1000 may smooth the energy component for each filter bank of a signal of the noise voice 2318 for training, and train the voice recognition model 3000 by using the feature vector extracted based on the smoothed energy component for each filter bank.

The electronic apparatus 1000 may accurately recognize user voice by using the voice recognition model 3000 obtained based on the target voice 2308 for training and the noise voice 2318 for training which are obtained by respectively augmenting the small amount of the target voice signals and the small amount of the noise signals. For example, even when a target voice signal 2322 from a user 2332 and a noise signal from a noise source 2334, for example, TV, a speaker, and the like, are obtained together, the electronic apparatus 1000 may accurately recognize user voice by accurately distinguishing the target voice signal 2322 of the user 2332 from the noise signal by using the voice recognition model 3000 trained based on target voice 2308 for training and the noise voice 2318 for training.

The method of recognizing, by an electronic apparatus, user voice, the method of processing an audio signal to train a voice recognition model, and the method of training, by an electronic apparatus, a voice recognition model, according to the above embodiments, may be implemented in the form of program instructions to be executed through various computer devices and may be recorded on a computer-readable medium. The computer-readable medium may include program instructions, data files, data structures, and the like solely or by combining the same. A program command recorded on the medium may be specially designed and configured for the disclosure or may be a usable one, such as computer software, which is well known to one of ordinary skill in the art to which the disclosure pertains to. Furthermore, a computer program product including a recording medium having stored thereon a program that allows the electronic apparatus to perform a method of providing a virtual apparatus related to an electronic apparatus may be provided through at least part of the contents displayed on the electronic apparatus.

A computer-readable recording medium may include magnetic media such as hard discs, floppy discs, and magnetic tapes, optical media such as CD-ROM or DVD, magneto-optical media such as floptical disks, and hardware devices such as ROM, RAM flash memory, which are specially configured to store and execute a program command. An example of a program command may include not only machine codes created by a compiler, but also high-level programming language executable by a computer using an interpreter.

Furthermore, the embodiments of the disclosure may be embodied in the form of a recording medium including computer executable instructions, such as a program module executed by a computer. A computer-readable storage medium may be a useable medium that is accessible by a computer and may include all of volatile and non-volatile media and separable and inseparable media.

For example, a device-readable storage medium may be provided in the form of a non-transitory storage medium. The "non-transitory storage medium" is a tangible device and merely means that no signal, for example, electromagnetic wave. Such a term does not distinguish a case in which data is semi-permanently stored in a storage medium from a case in which data is temporarily stored in a storage medium. For example, the "non-transitory storage medium" may include a buffer in which data is temporarily stored.

According to an embodiment, the method according to various embodiments disclosed in the specification may be provided by being included in a computer program product. A computer program product as goods may be dealt between a seller and a buyer. For example, a computer program product may be distributed in the form of a device-readable storing medium, for example, a compact disc read only memory (CD-ROM), through an application store, for example, PlayStore™, or directly on line between two user devices, for example, smartphones. For on-line distribution, at least part of a computer program product, for example, a downloadable application, may be at least temporarily stored in or temporarily generated from a device-readable storing medium such as a manufacturer's server, a server of an application store, or a memory of a relay server.

Therefore, the embodiments disclosed in the disclosure are intended to illustrate the scope of the technical idea of the disclosure, and the scope of the technical idea of the disclosure is not limited by the embodiments. The protection scope of the disclosure should be construed based on the accompanying claims, and it should be construed that all of the technical ideas included within the scope equivalent to the claims are included within the right scope of the disclosure.

The invention claimed is:

1. A method of recognizing a user voice, the method comprising:
    obtaining an audio signal segmented into a plurality of frame units;
    determining an energy component for each filter bank by applying a filter bank distributed according to a preset scale to a frequency spectrum of the audio signal segmented into the plurality of frame units;
    smoothing the determined energy component for each filter bank;
    extracting a feature vector of the audio signal based on the smoothed energy component for each filter bank; and
    recognizing the user voice in the audio signal by inputting the extracted feature vector to a voice recognition model,
    wherein the obtaining of the audio signal comprises determining a window length of a window to segment into the plurality of frame units, and
    wherein the window length of a window used when a vocal tract length perturbation (VTLP) is applied to the frequency spectrum of a training signal is different from the window length of a window used when a room impulse (RIR) filter is adopted and the window length of a window used when actually obtained user voice in the audio signal is recognized.

2. The method of claim 1, wherein the obtaining of the audio signal comprises:
    overlapping windows having the determined window length at predetermined window intervals; and
    segmenting the audio signal into the plurality of frame units by using the overlapped windows.

3. The method of claim 1, wherein the determining of the energy component for each filter bank comprises:
    applying the distributed filter bank to the frequency spectrum of the audio signal;
    converting a value of the frequency spectrum to which the filter bank is applied, to a log-scale; and
    determining the energy component for each filter bank by using the value of the frequency spectrum that is converted to the log-scale.

4. The method of claim 1, wherein the smoothing of the determined energy component for each filter bank comprises:
    training, for each filter bank, a smoothing coefficient to smooth the energy component for each filter bank based on a uniformly distributed target energy component; and
    smoothing the energy component for each filter bank by using the smoothing coefficient trained for each filter bank.

5. The method of claim 1, wherein the smoothing of the determined energy component for each filter bank comprises:
    generating a histogram related to a size of the energy component for each filter bank of the audio signal;
    determining a mapping function to map the generated histogram to a target histogram in which the size of the energy component for each filter bank is uniformly distributed; and
    smoothing the energy component for each filter bank by converting the energy component for each filter bank of an audio signal by using the determined mapping function.

6. The method of claim 1, wherein the extracting of the feature vector of the audio signal comprises:
    determining a discrete cosine transform (DCT) coefficient by performing discrete cosine transform on the smoothed energy component for each filter bank; and
    extracting a feature vector comprising at least one of the determined DCT coefficients as an element.

7. The method of claim 1, wherein the voice recognition model is pre-trained, based on the feature vector of an audio training signal re-synthesized by using the frequency spectrum of the audio training signal in which frequency axis of the frequency spectrum of the audio training signal obtained for each frame unit is transformed, to represent a variation of different vocal tract lengths of a plurality of speakers.

8. The method of claim 7, wherein the frequency axis of the frequency spectrum of the audio training signal is transformed based on a warping coefficient randomly generated for each frame and a warping function to transform the frequency axis on the frequency spectrum of the audio training signal based on the warping coefficient.

9. The method of claim 7, wherein the voice recognition model is pre-trained, based on the re-synthesized audio training signal to which a room impulse filter indicating an acoustic feature of the audio signal for each transfer path in a room in which the audio signal is transmitted is applied.

10. The method of claim 7, wherein the re-synthesized audio training signal is generated by performing inverse fast Fourier transform on the frequency spectrum of the audio training signal in which the frequency axis is transformed and overlapping, on a time axis, the frequency spectrum of the audio training signal that is inverse fast Fourier transformed.

11. An electronic apparatus for recognizing a user voice, the electronic apparatus comprising:
a memory storing one or more instructions; and
a processor configured to execute the one or more instructions,
wherein the processor is further configured to, by executing the one or more instructions:
obtain an audio signal segmented into a plurality of frame units,
determine an energy component for each filter bank by applying a filter bank distributed according to a preset scale to a frequency spectrum of the audio signal segmented into the plurality of frame units,
smooth the determined energy component for each filter bank,
extract a feature vector of the audio signal based on the smoothed energy component for each filter bank, and
recognize the user voice in the audio signal by inputting the extracted feature vector to a voice recognition model,
wherein the processor is further configured to determine a window length of a window to segment into the plurality of frame units, and
wherein the window length of a window used when a vocal tract length perturbation (VTLP) is applied to the frequency spectrum of a training signal is different from the window length of a window used when a room impulse (RIR) filter is adopted and the window length of a window used when actually obtained user voice in the audio signal is recognized.

12. The electronic apparatus of claim 11, wherein the processor is further configured to, by executing the one or more instructions:
train, for each filter bank, a smoothing coefficient to smooth the energy component for each filter bank based on a uniformly distributed target energy component, and
smooth the energy component for each filter bank by using the smoothing coefficient trained for each filter bank.

13. The electronic apparatus of claim 11, wherein the processor is further configured to, by executing the one or more instructions:
generate a histogram related to a size of the energy component for each filter bank of the audio signal,
determine a mapping function to map the generated histogram to a target histogram in which the size of the energy component for each filter bank is uniformly distributed, and
smooth the energy component for each filter bank by converting the energy component for each filter bank of an audio signal by using the determined mapping function.

14. The electronic apparatus of claim 11, wherein the voice recognition model is pre-trained, based on the feature vector of an audio training signal re-synthesized by using the frequency spectrum of the audio training signal in which frequency axis of the frequency spectrum of the audio training signal obtained for each frame unit is transformed, to represent a variation of different vocal tract lengths of a plurality of speakers.

15. A non-transitory computer-readable recording medium having recorded thereon a program for executing, on a computer, the method defined in claim 1.

* * * * *